United States Patent [19]

Brackett et al.

[11] Patent Number: 4,697,376
[45] Date of Patent: Oct. 6, 1987

[54] PALMING GRIP FISHING ROD

[75] Inventors: John E. Brackett, Minneapolis; Larry J. Dahlberg, Brainerd, both of Minn.

[73] Assignee: Fishing Designs, Inc., Minneapolis, Minn.

[21] Appl. No.: 946,823

[22] Filed: Dec. 29, 1986

Related U.S. Application Data

[63] Continuation-in-part of Ser. No. 842,309, Mar. 21, 1986, which is a continuation-in-part of Ser. No. 610,609, May 15, 1984, Pat. No. 4,577,432.

[51] Int. Cl.⁴ ............................................. A01K 87/00
[52] U.S. Cl. ......................................... 43/23; 43/18.1
[58] Field of Search ........................... 43/18.1, 18.5, 23

[56] References Cited

U.S. PATENT DOCUMENTS

| | | | |
|---|---|---|---|
| 2,018,923 | 10/1935 | Potter | 43/18.1 |
| 2,145,612 | 1/1939 | Scogland et al. | 43/23 |
| 2,561,237 | 7/1951 | Shafer | 43/23 |
| 2,667,713 | 2/1954 | Stephens | 43/23 |
| 3,557,483 | 1/1971 | Wilson | 43/23 |
| 3,685,195 | 8/1972 | Merryweather | 43/18.1 |

Primary Examiner—M. Jordan
Attorney, Agent, or Firm—Moore & Hansen

[57] ABSTRACT

A fishing rod handle having a butt grip segment and a reel seat segment, with at least the butt grip segment being laterally offset at a forward location thereon behind the reel seat segment, on the opposite side of the reel seat segment from that on which the crank of a reel would be positioned. The rear end of the reel seat segment may also be laterally offset on the same side of the handle to provide a complimentary, offset contour merging with the laterally offset butt grip segment. Such a laterally offset fishing rod handle may also be provided with a curved surface on the offset side of the butt grip, with the curved surface being snuggly received within the palm of the user's hand, when palming the butt grip, reel seat, and reel. Canting or rotating of the laterally offset butt grip towards the laterally offset side also ensures that more of the user's hand will be positioned on the top surface of the butt grip to effectively resist and control leveraged upward rod forces resulting from forward and downward pulling forces on the rod tip.

30 Claims, 40 Drawing Figures

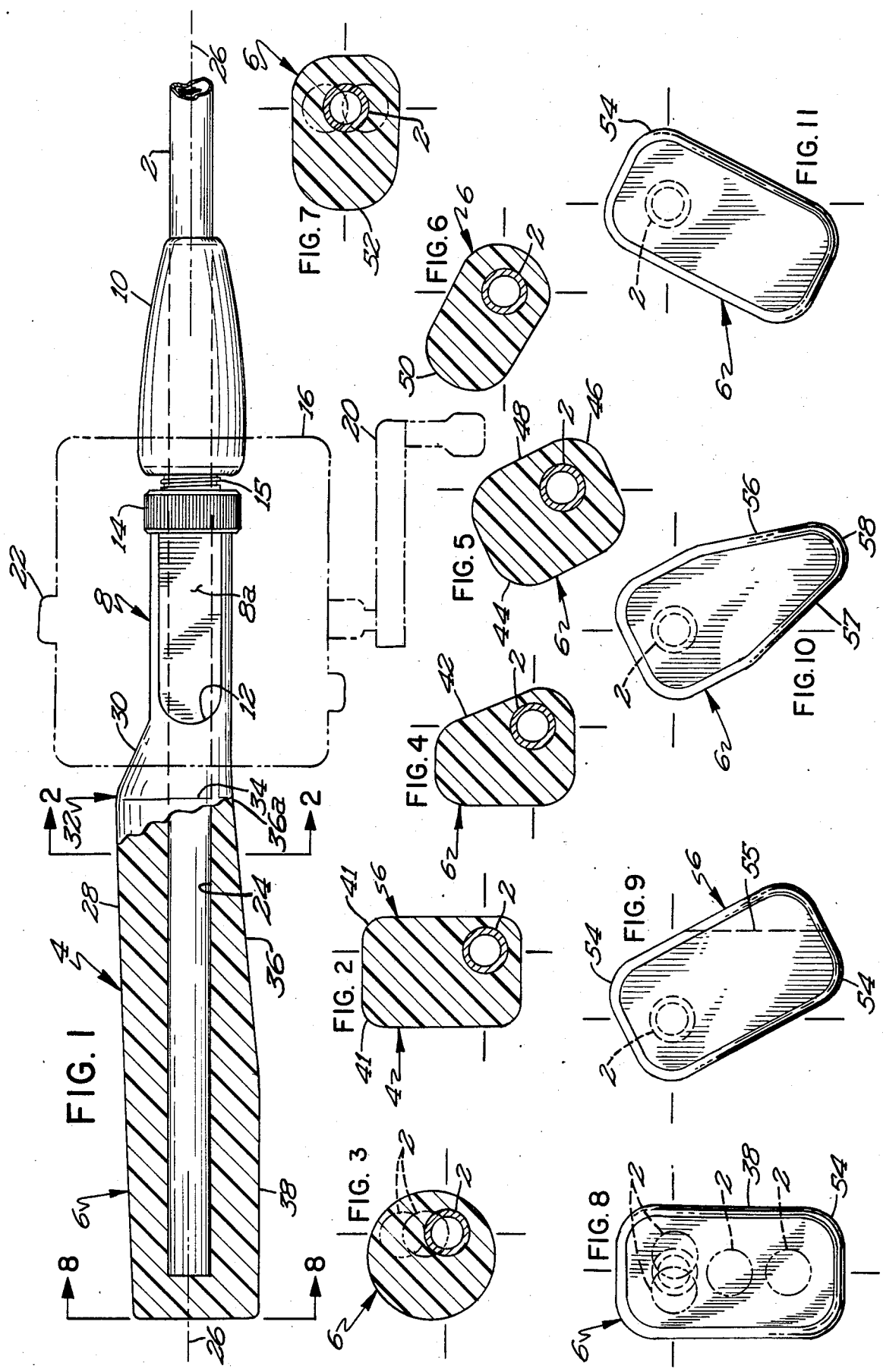

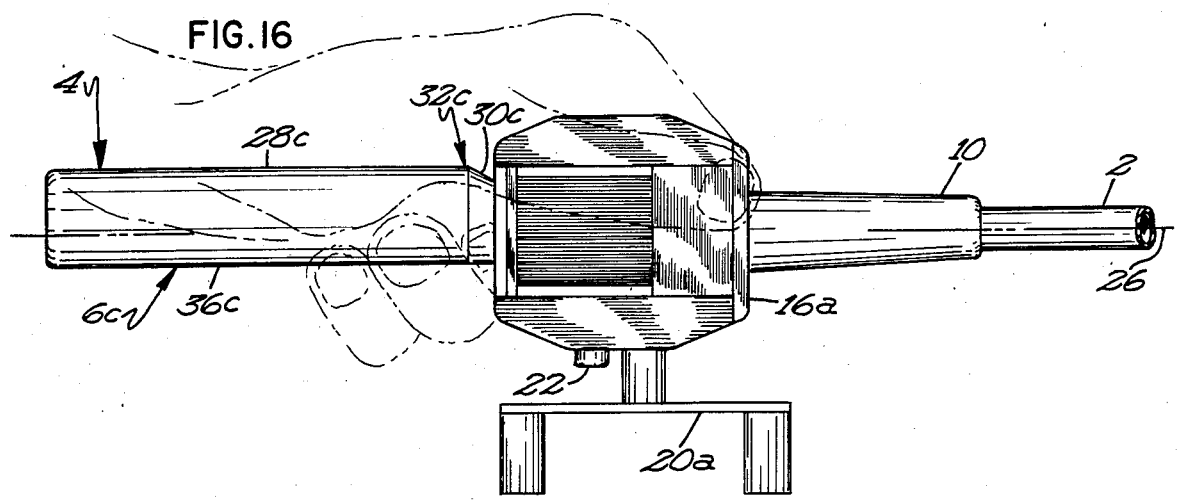
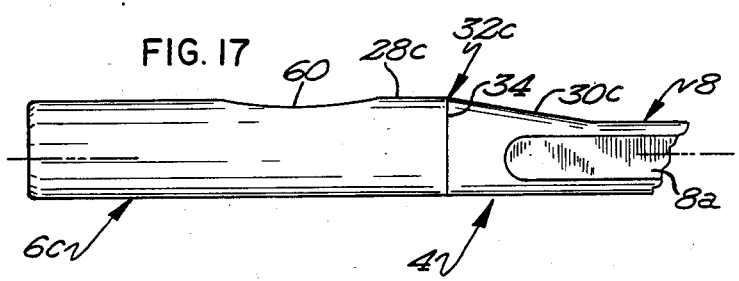
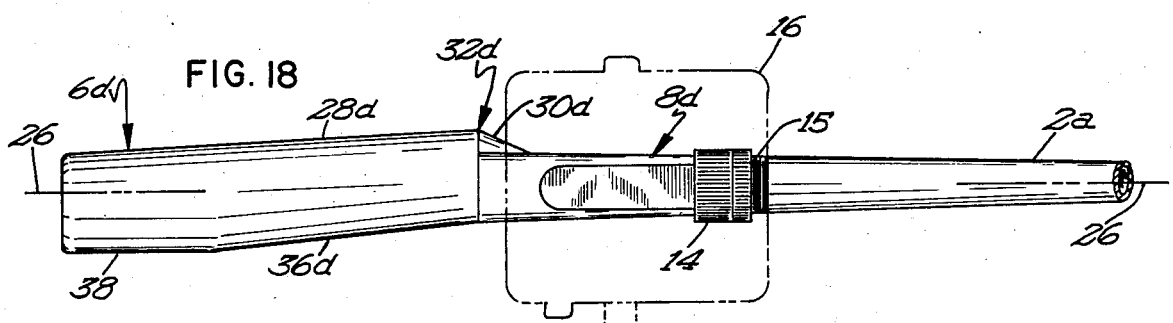
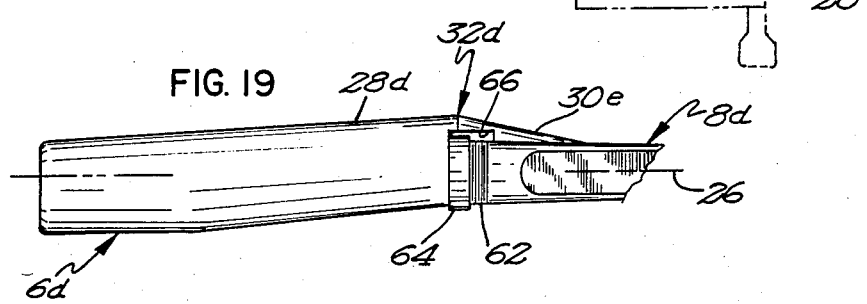

PALMING GRIP FISHING ROD

BACKGROUND OF THE INVENTION

This application is a continuation-in-part of Application Ser. No. 842,309, filed on Mar. 21, 1986. That application is a continuation-in-part of Ser. No. 610,609, filed May 15, 1984, now U.S. Pat. No. 4,577,432 issued on Mar. 25, 1986.

The aforesaid copending application, Ser. No. 842,309, discloses a fishing rod and handle construction wherein laterally offset, complimentary projections are provided in the area where the forward end of the butt grip segment and the rear end of the reel seat segment merge together. Those complimentary projections provide a continuously contoured projection particularly adapted to fit comfortably into the palm of the user's hand when gripping the butt grip, reel, and reel seat with a so-called palming grip. The palming grip projection, which may advantageously take the form of a partial helix, provides improved mechanical advantage and comfort for the palming grip user. In combination with a rod shaft extending through the reel seat segment and longitudinally into the butt grip segment of the handle, greater strength, lightweight construction, and enhanced sensitivity are achieved.

The handle construction disclosed herein is directed to improving the ability of the user to effectively hold the handle in such a way with a palming grip as to counter and resist forward and downward pulling forces on the front end of the rod, when using a bait casting, spin casting, or spinning rod.

An essential function of a fishing rod is to permit the user to hold, engage, and resist in a controlled manner, forward and downward pulling forces on the front end of the rod. A fishing rod is an elongated lever. The user holds the rear end of the lever, and the opposite or front end of the lever accommodates a suitably connected fishing line. In the act of fishing, the hook, bait, or lure connected to the fishing line pulls on the line in an outward and forward direction away from the user, as does a fish when it takes the bait or lure. This pulling action becomes a forward pulling force on the front end of the rod, with a downward force component as well.

While these leveraged rod forces can occur in a full multidirectional range from zero degrees to three hundred and sixty degrees, the rod forces will normally act forwardly and downwardly at the fishing line or front end of the rod lever, this being the tip of the rod. Such forces occur in downward and forward directions with the rod being held in the normal position for retrieving. Those forces are transmitted in the form of reaction forces acting as an upward rod force on the butt grip segment of the rod handle where the butt grip is held in the user's hand. A forward part of the user's hand engages the handle at a location resisting these forward pulling and downward forces on the rod tip so as to create a pivot point for the rod lever. As a result, the rod tip encounters a downward force, with the upward forces acting on the butt grip segment of the handle rearwardly of the pivot point along a rearward lever arm so as to tend to force the butt grip upwardly, out of the user's hand. This upward leveraged force acts directly against the user's hand. The lever lengths and resulting magnitude of these rod forces can vary greatly, and the initiating force can be the pull of a lure or the pull of a fish.

Leveraged upward forces on the butt grip present more of a problem on short, one-hand butt grip handles; however, such upward forces tending to urge the butt grip upwardly out of the user's hand also present a problem on two handed butt grips as well. That problem would particularly impact at the forward hand grip location on a longer butt grip handle.

The ability of a fisherman to engage, resist, and control leveraged upward rod forces on the butt grip is a particular problem for fishermen who hold a rod and reel in what is commonly referred to as a "palming grip" position. This position is utilized when the fisherman simultaneously grips part of the handle and part of the reel. A common palming grip usage is employed with rod and handle assemblies having a one hand, angled pistol grip, with a finger trigger grip under the reel seat area, and with top rod mounted bait casting or spin casting reels. One, two, or three fingers are placed forward of the trigger on the bottom of the handle in the reel seat area, and the user simultaneously holds onto part of the reel seat, trigger, reel, and butt grip with one hand, which would normally be the left hand when utilizing a reel with a right hand crank. In a common left handed palming grip position, two fingers are placed forward of the trigger on the bottom of the handle. The user's thumb is placed on top of the reel, and the forward part of the user's hand, including the palm, grips and contacts the left side of the reel. The middle and rear of the user's hand, and in particular the palm, contact and grip the left and top side of the butt grip behind the reel. The user's little and fourth finger curl around the bottom of the butt grip behind the trigger and contact and grip both the bottom and right forward side of the butt grip.

The palming grip problem is that the fisherman's hand must simultaneously grip and hold part of the reel as well as part of the handle. Reels are considerably wider than rod handles, and the act of gripping and holding part of the reel as well as part of the butt grip segment of the handle behind the reel creates an excessively wide grip from the left side of the reel to the butt grip. As a result, the user's palming hand has inadequate and uncomfortable gripping contact and conformity to the gripped reel and handle. This is mechanically disadvantageous, and is very fatiguing and stressful to the user's hand and fingers. The mechanical disadvantage is that, with traditional handle structures and contours, it is not possible for the user to grip the handle in such a way, in the palming grip position, as to be able to effectively resist and counter leveraged upper rod forces on the butt grip segment of the handle. This problem is worsened by the particularly excessive wide gripping distance from the left side of the reel to the right, forward side of the butt grip.

The aforesaid excessively wide grip distances especially affect the user's fourth and fifth fingers. Those fingers, which curl under the handle and around the right side of the handle when viewed from the top rear, cannot easily reach the top of the butt grip because of the wide gripping distance in the palming position. Thus, those fingers cannot properly be positioned on the top surface of the butt grip where they could most efficiently resist leveraged upward rod forces acting on the handle. The uncomfortably fatigued and stressed little fingers must inefficiently engage and resist leveraged upward rod forces by squeezing on the right, forward side of the butt grip.

The palming grip problem is that the left side of the reel is laterally offset from the rod handle. The user's hand grip contact with the left side of the reel forces the user's hand to be laterally offset from the butt grip. Thus, the user's hand is actually angled outwardly from the forward end of the butt grip to the left side of the reel. As a result, a significant portion of the user's hand is not in contact with the butt grip segment of the handle. Not only is this uncomfortable, but, more importantly, there is not enough of the user's hand, including the fingers, positioned on the top of the butt grip segment to efficiently resist leveraged upward rod forces, as when the fisherman retrieves a lure, sets the hook, and fights, plays, and attempts to land a fish. These gripping problems are aggravated by the symmetrical arrangement of conventional fishing rod and handle assemblies wherein the butt grip is centered on the rod shaft, with both sides of the butt grip segment essentially aligned with and parallel to the rod shaft. Because of the distorted palming grip position of the hand in a laterally offset manner as aforesaid, it is impossible for the user's grip to conform to the shape of the handle behind the reel in the butt grip area. Discomfort and mechanical disadvantage thus result. When a palming grip fisherman tries to engage, resist or control leveraged upward rod forces on the butt grip of the handle with conventional handle constructions, the butt grip has a strong tendency to slip through the user's gripping hand in an upward direction.

The lack of palming grip contact with the handle also diminishes the fisherman's ability to fully utilize and benefit from the rod sensitivity characteristics of conventional rod and handle assemblies. Rod sensitivity is the fisherman's ability to feel rod vibrations and subtle leveraged upward rod forces.

The aforesaid grip problems of inadequate grip conformity to the rod handle and inadequate grip contact with the handle with resulting inability to resist leveraged upward rod forces is a lesser but similar problem with spinning rod and reel assemblies having the reel mounted on the bottom or underside of the rod.

The current state of the art does not adequately recognize and deal with the aforesaid palming grip problems. The approach of the fishing rod industry has been to improve the strength and flexural characteristics of rod shafts with materials such as fiberglass, graphite, and boron, in an effort to enhance the ability of the fisherman to counter leveraged upward forces on the gripping area of the rod handle. The sought after features of strength, sensitivity, and light weight in rod and handle constructions has been improved with the blank though-offset rod and handle assemblies as disclosed in our U.S. Pat. No. 4,577,432 referenced above. Those same design objectives have also been met to some extent with the use of one-piece rod and handle units wherein the rod shaft is expanded at its base or rear end to form the reel seat segment. Shimano American Corporation markets such a rod in the United States.

Sensitivity to rod vibrations has been improved by current handle constructions which utilize exposed rod shafts in bottom gripping areas of the butt grip and reel seat segments of the handle. Such constructions also reduce user gripping distances from top to bottom of the handle because of the exposed ro thin wall sections on the bottom of the handle. U.S. Pat. No. 4,516,351 to Dennis N. Highby shows a rod and handle assembly having such an exposed rod shaft in the gripping area so that at least a portion of the user's hand will contact the rod to increase sensitivity. U.S. Pat. No. 4,463,512 issued to McCreery discloses a spinning rod with the rod resting in a groove in the bottom of a handle in such a way that the rod is exposed for contact with the hand of the fisherman. There have, however, been no prior handle constructions which particularly address the need for overcoming the aforesaid problems associated with holding the handle in the palming grip position. U.S. Pat. No. D165,529 to D. M. Kitterman shows a fishing rod handle which is apparently laterally offset to the right hand side when viewing the handle from the top at the butt grip end. However, the handle is offset only in the reel seat area or segment, and not at the forward end of the butt grip where the primary gripping action to resist upward forces on the handle would take place. Also, the right hand offset on the reel seat of the Kitterman patent design is on the wrong side of the reel seat to be of any assistance in palming with the left hand on handles equipped with right hand cranking reels.

In recent years, bait casting reels have been specifically modified to more effectively accommodate the palming grip. Current reels employ a low, flat profile, with a resulting reduction in the height of the reel. Also, the left side of such newer reels has been smoothly contoured, with oil caps having been moved from their traditional location on the left side of the reel to the right side. The smooth, left side of such lower profile reels has been contoured to comfortably accommodate laterally offset portion of the user's hand in the palming grip position.

Notwithstanding such advances in reel design, there have been no known improvements or modifications in rod and handle contours and constructions to effectively accommodate the palming grip and to eliminate or reduce the aforesaid problems associated with that gripping position. The fishing rod handle disclosed herein has been specifically constructed and contoured to meet such a need.

BRIEF SUMMARY OF THE INVENTION

The primary objective of this invention is to make fishing rod and handle assemblies physically easier to use, more comfortable, and easier to effectively grasp, retain, and control when fishing.

A particular objective is to provide a fishing rod handle so structured and contoured as to permit the user's hand to more closely conform to and engage the surface of the handle, and thus to grasp the handle more firmly and comfortably when using the above-described palming grip.

A further object is to reduce lateral gripping distances on the handle and reel in such a way as to place more of the user's gripping hand on top of the handle with resultant mechanical advantages. Specifically, this allows the fisherman to more efficiently counter leveraged upward rod forces acting on the gripping area of the handle when using the palming grip on part of the reel and part of the handle with bait casting and spin casting rod and reel assemblies. Mechanical advantages are also realized on spinning rods.

A still further objective is to improve sensitivity to rod vibrations and pulses by placing more of the user's hand in close proximity to the rod shaft on rod and handle constructions having the rod shaft extend at least part way into the butt grip segment of the handle.

These basic objectives are realized in all embodiments by constructing the handle so that it is laterally offset from the longitudinal axis of the rod shaft at least at a forward location on the butt grip segment of the handle behind the reel seat segment. To effectively accommodate the palming grip, the lateral offset is on the opposite side of the handle reel seat from that on which the crank of a reel will be located. This reduces hand grip lateral distances and comfortably places more of the user's hand grip on top of the butt grip.

In a preferred embodiment, the butt grip segment is angularly disposed at least along a forward portion thereof with respect to the rod shaft axis and angles outwardly in a forward direction towards the reel seat segment of the handle, away from the rod shaft so as to provide the desired lateral offset on the butt grip segment. This enables the handle to naturally conform to the user's angularly disposed grip when the fisherman's hand contacts both the butt grip and the left side of the reel in a left hand palming grip position. Optionally, the side of the butt grip segment which is offset may angle outwardly and forwardly from its rear end towards the reel seat segment along substantially the entire length of the butt grip segment.

In a particularly advantageous form of the laterally offset handle, the butt grip segment is rotated or canted in the direction of the lateral offset. This has the benefit of rotating the butt grip segment more into the user's hand, and thus permits more of the user's hand to firmly engage the top surface of the butt grip to resist upward, leveraged rod forces on the butt grip with particular mechanical advantage. The mechanical advantage is further enhanced in such a canted or rotated version of the laterally offset butt grip by placing the fourth and fifth fingers of the left hand palming grip on top of the butt grip. A similar beneficial effect is achieved by beveling or sloping the side of the butt grip opposite that on which it is laterally offset.

As a further beneficial feature, the rear end of the reel seat segment may also be laterally offset from the rod shaft axis on the same side of the reel seat segment as that on which the butt grip segment is laterally offset. The resulting contour more naturally conforms to the shape which the user's hand assumes when gripping both the forward end of the grip and the side of the reel in the palming grip position.

It is further contemplated that at least a portion of the rear end of the laterally offset butt grip, along the side thereof opposite that to which it is laterally offset, may be straight and substantially parallel to the rod shaft axis. Such a butt grip shape increases grip leverage and efficiency when gripping the handle for casting, as opposed to palming the handle when cranking the reel to retrieve a lure or a fish.

In a further advantageous embodiment, the side of the butt grip segment which is disposed on the opposite side of the reel seat from the reel crank handle angles outwardly, away from the rod shaft axis to a point of maximum lateral offset at a forward location thereon. The front end of the butt grip segment tapers inwardly towards the rod shaft from such a point of maximum offset towards a juncture with the rear end of the reel seat. On such a handle structure, the rear end of the reel seat segment may be centered on the rod shaft, or it may also be laterally offset in the same direction as the forward end of the butt grip to merge therewith. Such an inwardly tapered, front end of the butt grip forms a lateral outward projection which conforms particularly well to the natural shape of the user's hand in the palming position.

In all of the embodiments of the laterally offset butt grip, the lateral offset may be curved and smoothly contoured to most comfortably fit into and conform to the shape of the inside of the user's hand in the palming position.

A particularly advantageous construction of a laterally ofset handle is achieved by utilizing an elongated attachment shaft to secure the butt grip segment to the reel seat segment, with the attachment shaft extending generally parallel to the axis of the rod shaft. Such a handle construction permits a wide latitude in the extent to which the butt grip segment may be laterally offset to one side of the reel seat segment, while maintaining structural integrity.

All of the embodiments of the laterally offset handle improve sensitivity by placing more of the fisherman's hand in direct contact with the handle of the rod to effectively feel rod vibrations or subtle leveraged upward rod forces. Sensitivity is further enhanced in embodiments utilizing a so-called "blank-through" rod construction with the rod shaft extending through the reel seat segment and into the butt grip segment by exposing the rod shaft on the top surface, bottom, and/or side of the butt grip segment for direct contact with the hand or the fingers of the fisherman.

These and other objects and advantages of the invention will be readily understood as the following description is read in conjunction with the accompanying drawings wherein like reference numerals have been utilized to designate like elements throughout the several views.

BRIEF DESCRIPTION OF THE DRAWINGS

FIG. 1 is a top, plan view, partially in section, showing a preferred embodiment of the improved fishing rod handle and rod assembly of this invention;

FIG. 2 is a vertical section view through the handle, taken along lines 2—2 of FIG. 1;

FIGS. 3-7 are section views taken at the same location as FIG. 2 through the forward end of the butt grip of FIG. 1 and showing alternative embodiments of the cross sectional shape and orientation of the forward end of the butt grip segment of the rod handle;

FIG. 8 is an end view of the butt grip segment of the handle of FIG. 1;

FIGS. 9-11 are alternative embodiments of the handle of FIG. 1, taken at the same end location as FIG. 8;

FIG. 16 is a top, plan view of a handle, rod and reel assembly depicting a different embodiment of the butt grip segment of the handle, which is offset laterally over substantially its entire length;

FIG. 17 is a fragmentary, top plan view similar to FIG. 16, and showing a concave or curved indent on the offset side of the butt grip segment of the fishing rod handle;

FIG. 18 is a top, plan view of the preferred embodiment of FIG. 1, but with a different type of rod shaft and handle construction and assembly;

FIG. 19 is a top, plan view of the handle, similar to FIG. 18, and showing a different shape on a laterally offset reel seat in combination with a reel seat locking nut located at the rear end of the reel seat;

DESCRIPTION OF THE PREFERRED EMBODIMENTS

Figure 12:
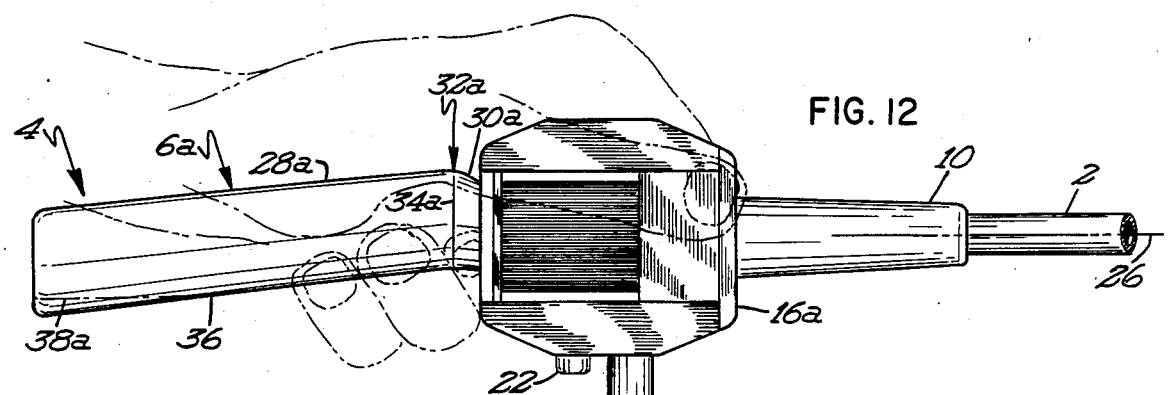
FIG. 12 is a top, plan view of an embodiment of the rod and handle assembly, similar to FIG. 1, but with the entire butt grip segment of the handle angularly disposed, and with a palming grip reel shown mounted on the handle.

Referring now to the drawings, there is shown in FIGS. 1, 2, and 8 a preferred embodiment of the laterally offset fishing rod handle of this invention, with a rod shaft assembled to the handle. The rod and handle assembly shown in FIG. 1 is of the casting rod type, which is adapted to have either a bait casting reel or a spin casting reel mounted on a reel seat on top of the rod or rod handle. Bait casting reels are those having an open spool which the user must thumb when casting. Spin casting reels are fully enclosed and normally include a button or other actuator which the user must manipulate with his thumb to release the line when casting.

As shown in FIG. 1, the fishing rod and handle assembly is comprised of a rod shaft 2, and a handle generally indicated by reference numeral 4. The handle is comprised of a butt grip segment 6 and a reel seat segment 8 positioned forwardly of the butt grip. A foregrip 10 is also shown on the rod shaft in front of the reel seat 8. Various known materials may be used for the rod shaft and the handle. The rod may be made of graphite, metal, or plastic material with the appropriate physical qualities of strength and flexibility. The handle may be molded from plastic material, or formed from cork, rubber, or wood. In the preferred embodiment, the rod blank or shaft would be made of graphite, the reel seat 8 would be formed from molded plastic material, and the butt grip segment 6 would be molded as a single component from rubber or plastic. In FIGS. 1 and 2, the butt grip segment 6 is shown as being formed from plastic material. Foregrip 10 would normally be made of the same material as the butt grip segment.

Figure 15:
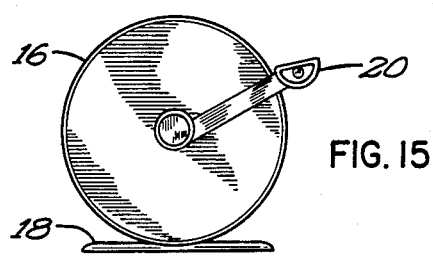
FIG. 15 is a side elevation view of a standard fishing reel which is not particularly contoured or formed for a palming grip.

Reel seat segment 8 is formed on its top surface to provide a downwardly recessed reel seat 8a having a rearwardly extending, cutaway recess 12 at its rear end. At the forward end of reel seat 8a, there is a lock nut 14 which is threaded onto threads 15 formed on the external surface of the reel seat segment 8. A casting reel, for example a bait casting reel as indicated in phantom lines by references numeral 16 on FIG. 1, would be mounted on top of reel seat 8a. Such a conventional bait casting reel is also shown in FIG. 15, and has a foot 18 on the bottom thereof. The rear end of the foot 18 would be received within the recess 12 at the back of reel seat 8a, and the front end of reel foot 18 would slide under hold-down nut 14. Nut 14 can be threadedly adjusted back and forth on threads 15 to tightly secure reel foot 18 in place. Reel 16, as shown in FIG. 1 and also in FIG. 15, has a crank handle 20 on its right hand side, and an oil cap 22 on its left side. As used herein, the terms "left side" and "right side" are used to designate the opposite sides of the handle and reel, in the top view, when viewing the handle of FIG. 1 from the rear end of butt grip segment 4. Reel 16 as shown in FIGS. 1 and 15 is not of the type which is particularly contoured and constructed for palming grip operation. Such reels have a cap on the left side, as shown at 22.

As shown in FIGS. 1-11, the rod and handle assembly is of the blank-through type wherein the rod blank or shaft extends all of the way through the reel seat segment 8, and longitudinally within butt grip segment 6. For that purpose, handle 4 has a bore 24 extending longitudinally therein within which rod shaft 2 is received and contained within both the reel seat and butt grip segments. Such a handle and rod shaft assembly provides a particularly strong, lightweight and sensitive fishing rod structure.

As is shown in the top, plan view of the rod and handle assembly depicted in FIG. 1, butt grip segment 6 is provided at its forward end, at a forward location thereon behind reel seat segment 8, with a structure and shape which causes it to be laterally offset to the left, from the longitudinal, central axis 26 of rod shaft 2. The laterally offset portion of butt grip segment 6 is indicated by reference numeral 28. A complimentary, mating lateral offset 30 is formed on the rear end of reel seat segment 8, and extends laterally outwardly from the same side of reel seat segment 8 as does butt grip offset 28. Butt grip offset 28 and reel seat lateral offset 30 merge along the juncture line 34 between the butt grip segment and the reel seat segment to provide a continuous, smoothly contoured lateral offset generally indicated by reference numeral 32. Lateral offset 32 is contoured to fit comfortably in the palm of the hand of the user when engaging the handle with a left hand palming grip as indicated in phantom lines in FIGS. 12 and 14. As viewed from the top in FIG. 1, the lateral offset 32 is radiused at the juncture area where the laterally offset butt grip segment and reel seat segment merge. This provides a smoothly curved and contoured offset projection which will fit comfortably and snuggly into the palm of the hand of the user when palming the left side of the butt grip 6 and the left side of reel 16. The radius of curvature of the lateral offset 32 may be varied to provide a smaller or larger curved projection, such a more prominently curved projection being shown in FIG. 1 of our above-identified copending application, Ser. No. 842,309.

Figure 14:
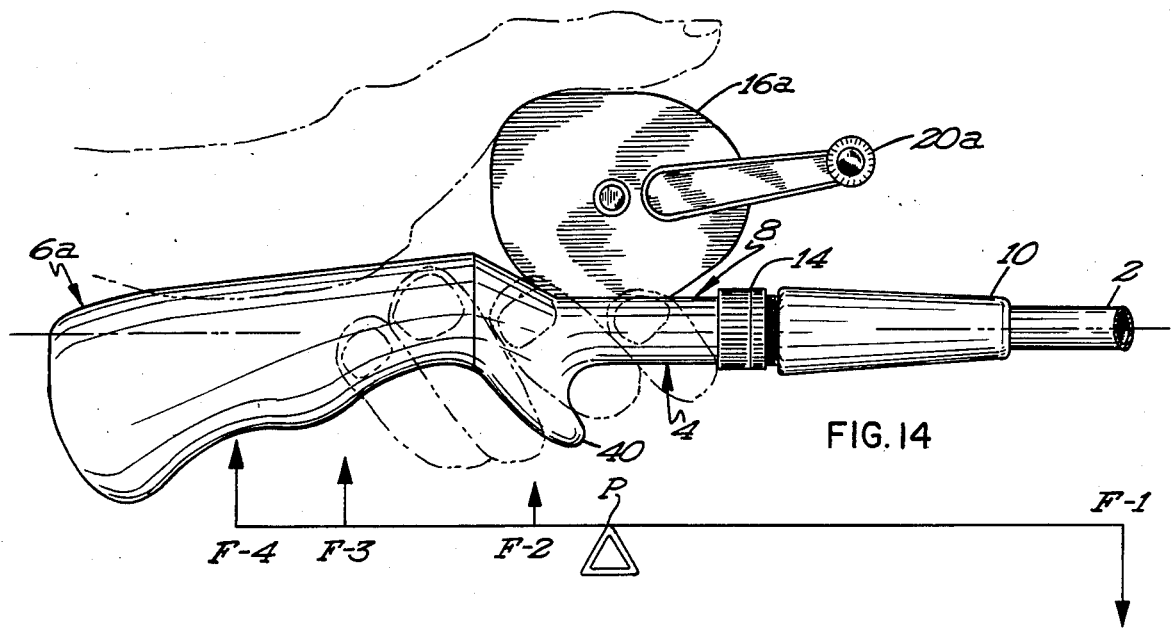
FIG. 14 is a side elevation view of the handle, rod, and reel assembly of FIG. 12 with the gripping hand of the user shown in place, and leveraged forces acting on the rod and handle assembly indicated diagramatically.

To further assist in lessening gripping distances in the palming position, and to enhance comfort and mechanical advantages, the right, forward side of the butt grip segment 4, as shown at 36 in FIG. 1, angles or tapers inwardly towards the rear end of reel seat segment 8. Preferably, a very slight curve, having a large radius of curvature is provided at the juncture 36a of side wall 36 with the right, rear side of reel seat segment 8. Also, as is shown in FIG. 1, the right, rear side 38 of butt grip segment 4 is formed to extend straight, in a direction generally parallel to and in alignment with rod shaft axis 26. This has the benefit of orienting the rear of the user's hand straight forward, in general alignment with the rod shaft 2. As a result, casting grip leverage and efficiency are advantageously increased, and straight casts along the line desired are assured, when gripping butt grip segment 4 with the right hand for casting, with a right hand cranking reel as shown in FIGS. 1, 12, and 14. With such an embodiment, only the forward end of butt grip segment 6 is angled to the left to provide the desired lateral offset; however, the entire left side of butt grip segment 6 may angle outwardly and forwardly from its rear end towards reel seat segment 8 along substantially the entire length thereof, as shown in FIG. 1, if desired. The most important consideration is that the butt grip segment be laterally offset along its forward end towards the opposite side of the reel seat from that on which the crank 20 of a casting reel is located. It is to be noted that while right hand cranking reels have been shown throughout, with the handle laterally offset to the left, left hand cranking reels could also be utilized. In such a rod and reel assembly, the lateral offset would then be to the right, to be on the opposite side of the reel seat from the handle crank, and to provide the mechanical advantages and comfort benefits disclosed herein.

The reel shown in FIGS. 12 and 14 is a so-called palming grip reel which has been flattened to provide a lower profile as shown in FIG. 14, and beveled along its side walls as shown in FIG. 12 to more closely adapt and conform to the palming grip of the user. The palming grip reel 16a is also provided as shown with a right hand crank 20a.

With reference to FIGS. 12 and 14, it will be noted that the hand of the user extends around the forward end of the butt grip segment 6 or 6a, and around the left side of the reel 16 or 16a. The hand and palm of the user will also engage the reel seat segment 8, with the four fingers of the left hand extending under and around the underside of the reel seat segment 8 and of the forward end of butt grip segment 6 or 6a. With a pistol grip type of handle having a finger trigger 40 projecting from the bottom side of the reel seat segment 8 as shown in FIG. 14, one or more of the user's fingers will extend against the underside of the trigger 40 and the trigger indent, forwardly of the trigger on reel seat segment 8. In a commonly applied palming grip, the last two fingers of the left hand will curl under butt grip segment 6 or 6a and up around the right side thereof, with the other two fingers wrapped under and around reel seat segment 8 forwardly of trigger 40. User preference dictates whether one, two, or three fingers of the fisherman would be positioned forwardly of the trigger 40 against the underside of reel seat segment 8. When thus palming the rod handle with the left hand, as would be done when retrieving or playing fish, the right hand would be free to operate the crank 20 or 20a on the right side of the reel.

Such a right handed fisherman would normally grip the handle with his right hand when casting. In the right handed casting position, the palm of the user would wrap around the right hand side of the butt grip, with the thumb over the top of the reel to control the release of the line from the reel spool, on a conventional bait casting reel. The right forefinger would be engaged around the reel seat trigger 40. After casting, the user would normally switch the rod to his left hand for the left hand palming position as described herein.

It is to be noted that reels are now being manufactured with the cranks on the left side for left handed fishermen or for persons who want to reel with their left hand. With such reels, the left handed user would cast with the left hand and then switch to the right hand for retrieving and playing fish. For such left handed persons, with cranks on the left side of the reel, the contour of the handle 4 would be reversed so as to provide the lateral offset on the right side of the reel, and all other butt grip shapes and cross sections would be reversed laterally from the embodiments shown on described herein.

FIG. 14 is a side elevation view of FIG. 12, but also would be an appropriate side elevation of the embodiment of FIG. 1 utilizing a pistol grip type of handle as shown in FIG. 14. In FIG. 14 there is illustrated diagramatically the leveraged forces which normally act on a fishing rod and handle. The drag of a lure, and of course the weight of a fish, acting through the fishing line wound on the reel will normally cause forward and downward forces on the rod tip, with the line passing through guides along the length of the rod in a well known manner. There will thus be a downward force component acting at the rod tip. Force line F-1 in FIG. 14 illustrates such a force. Rod shaft 2 is broken away in FIG. 14, but force F-1 would of course be acting downwardly at the rod tip. With the user's hand gripping the handle on the underside of reel seat segment 8 as shown in FIG. 14, in resistance to such downward forces, a pivot point P is created at the approximate location shown in FIG. 14. With downward force F-1 acting along a moment arm extending from the rod tip to pivot point P, a highly leveraged downward force will be created, with resultant upward, leveraged forces. Such upward leveraged forces are illustrated at F-2, F-3, and F-4, directed upwardly on the rod handle 4, and acting along moment arms to the left side of pivot point P. Leveraged, upward forces F-3 and F-4 will be acting on the butt grip segment 6a of the handle, and thus tending to force the butt grip upwardly out of the grasp of the user, especially when using the palming grip as indicated in phantom lines in FIGS. 12 and 14. With conventional handled rods, this problem will be accentuated because the user's hand is forced to be angled outwardly from the left side of butt grip segment 6 or 6a towards the left side of the reel 16 or 16a in the palming grip position. Thus, a large portion of the front end of the user's hand will not be in contact with any portion of the handle.

The aforesaid problem is greatly reduced, if not eliminated, by the laterally offset handle as described above with respect to FIG. 1. The lateral offset assures that more of the user's hand will be in firm, grasping contact with the forward end of the butt grip segment, in conforming relation thereto. With the reduced gripping distances in a lateral direction from the front end of the butt grip segment 6 to the left side of reel 16 or 16a, more of the user's hand will be positioned on top of butt grip segment 6, 6a. Thus, with more of the user's hand firmly engaging the top surface of butt grip segment 6, 6a, as illustrated in phantom lines in FIGS. 12 and 14, the user will be better able to resist upward, leveraged forces acting on the butt grip segment 6, 6a, as shown by force lines F-3 and F-4.

It is the rear end of the hand, and in particular the base end of the thumb and the rear portion of the palm of the fisherman, which mainly engages the butt grip where the butt grip tends to slip out of the fisherman's hand due to the upward leveraged forces on the butt grip. Accordingly, by putting more of the rear end of the palm on the top side of the butt grip, as illustrated in FIGS. 12 and 14, upward forces tending to force the butt grip outward of the user's hand are best resisted. The lateral offset on the handle and the disclosed contours and structures of the butt grip are provided along the portions of the butt grip which are engaged by the user's hand in order to provide mechanical advantages and increased comfort.

The particular cross sectional shapes and overall structures and contours of the butt grip segment 6 as illustrated in FIGS. 2-7 are particularly adapted to improving contact of the fisherman's hand with the butt grip segment and resisting upward leveraged forces on the butt grip segment, when utilizing the palming grip. FIG. 2 illustrates a generally rectangular shape for the forward end of butt grip segment 6 along section lines 2—2, extending in a plane generally perpendicular to rod shaft axis 26. Preferably, the corners of the butt grip segment are curved as indicated at 41 in FIG. 3 so as to more comfortably fit into the hand of the user. With butt grip segment 6 in the form of a pistol grip as illustrated in FIG. 14 in side elevation, the rod shaft 2 extending into the butt grip will be at the lower location on the forward end of the butt grip segment as shown in FIG. 2. With such a construction, the butt grip segment is offset upwardly above the rod shaft 2, behind the reel seat. This has the benefit of elevating the butt grip behind the reel seat, and reducing the thumb-to-spool gripping distance for better thumbing control of a casting reel 16, 16a positioned on top of the reel seat 8a.

FIGS. 2-7 are alternative embodiments of the cross sectional shape and orientation of the forward end of butt grip segment 6, at the location of section line 2—2. FIG. 3 illustrates a circular or round shape for the forward end of butt grip segment 6. Also, as shown in FIG. 3, the rod shaft 2 may be disposed at alternative vertical locations in butt grip segment 6 above that shown in solid lines, as indicated in phantom.

FIG. 4 illustrates a generally rectangular cross sectional shape for butt grip segment 6, but with the right side of the forward end of butt grip segment 6 beveled or inclined upwardly and inwardly as indicated by reference numeral 42. Inclined side wall surface 42 extends in a plane generally parallel to that of rod shaft axis 26. The beveled or inclined side wall surface 42 on the right side of butt grip segment 6 facilitates the positioning of the end extremities of the user's fingers further around the top surface of the butt grip segment, and also permits the fingers to exert a downward resisting force on the horizontal component of inclined side wall surface 42. With such a handle structure, the fisherman is better able to effectively resist leveraged upward rod forces on the butt grip segment when utilizing a left hand palming grip as illustrated in FIGS. 12 and 14.

FIG. 5 is a preferred embodiment of the forward cross section of butt grip segment 6. The shape as shown in FIG. 5 is generally rectangular, with rounded or curved corners as indicated by reference numerals 44 and 46 on the top and bottom surfaces of the butt grip segment. In the embodiment of FIG. 5, the forward portion of butt grip segment 6 comprising the lateral offset 28, 32 is canted or rotated in a counterclockwise direction about rod shaft axis 26, towards the laterally offset side of butt grip segment 6. This has the particular benefit of rotating the top of the butt grip to the left or counterclockwise as viewed in FIG. 5, so that more of the top surface of the butt grip firmly engages the user's hand to resist upward, leveraged rod forces on the butt grip. Also, the fourth and fifth fingers of the left hand palming grip rest upon the inclined side wall surface 48 of the canted butt grip as shown in FIG. 5 with the same improved mechanical advantage towards bearing downwardly against upward forces as is realized by the beveled wall surface 42 of FIG. 4. Also, the curved top corners 44 of the canted or rotated butt grip FIG. 5 will fit snuggly and securely into the palm of the hand of the user. The left curved top corner 44 will increase the palm of the user, thereby causing the user's hand to wrap more completely around the butt grip segment to provide a firmer, more controlled grip. It is to be noted that the butt grip segment with the round cross section shape of FIG. 3 could also be rotated to the left about the eccentric or offset axis 26 of rod shaft 2 to provide benefits similar to that described with respect to FIG. 5. Also, any of the vertical locations for the rod shaft 2 within the butt grip segment 6 illustrated in FIG. 2 could also be utilized in the FIG. 5 embodiment.

FIG. 6 illustrates another embodiment wherein the cross section of the butt grip segment at section lines 2—2 could be of elongated or oval shape, with a rounded top surface as indicated by reference numeral 50. The forward end of the butt grip could be canted or rotated over to the laterally offset side in a rather extreme manner as illustrated in FIG. 6 to enhance the mechanical advantages.

FIG. 7 illustrates a laterally elongated cross sectional shape for the forward end of the butt grip, with a curved left side 52 for comfortable fit into the hand of the user. Again, the rod shaft 2 could have a variety of vertical locations as indicated by the phantom lines in FIG. 7.

It is to be noted that all of the canted or rotated versions of the forward end of the butt grip have the particular advantage of greatly reducing lateral grip distance to the left side of the reel, from the top surface portion of the butt grip. Also, since the lateral gripping distance is greatest from the left side of the reel to the right side of the butt grip as viewed in FIG. 1, that gripping distance is also significantly reduced by the inwardly angled right side wall 36 of the butt grip segments as shown in FIG. 1, as well as by the use of inwardly and upwardly inclined side walls 42 and 48 as illustrated in FIGS. 4 and 5.

With a vertically elongated, rectangular cross sectional shape for the forward end of the butt grip as illustrated in FIG. 2, the rear end extremity of the butt grip would have the shape generally indicated in FIG. 8. With a pistol grip type of butt grip as shown in FIG. 14, the rear end of the rod shaft 2 would be towards the upper side of the rear end of the butt grip as shown in dotted lines in FIG. 8. The phantom lined circles in FIG. 8 indicate alternative lateral and vertical locations for the rod shaft 2 towards the rear end of butt grip segment 6.

The shape and structure of the rear end of the butt grip is not as critical to the enhancement of mechanical advantages and user comfort, especially when utilizing the palming grip. Accordingly, the rear end of the butt grip segment 6 could take a variety of shapes and orientations. FIGS. 9, 10, and 11 illustrate possible variations. FIG. 9 shows that the rear end of the butt grip segment 6 can be canted or rotated over to the left side of the handle, at its top end, in the same manner as the front end of the butt grip with respect to the embodiment shown in FIG. 5. With the front and rear ends of the butt grip thus canted or rotated to the left, butt grip segment 6 would be so canted along its entire length. If desired, the right side of the rear end of the butt grip can be formed to be vertically straight in a vertical plane and thus extend parallel to rod shaft axis 26, as indicated in phantom lines by reference numeral 55. Such a shape would permit increased casting control and efficiency as described with respect to straight rear end side wall 38 in FIG. 8. Vertically straight side wall segment 55, as shown in FIG. 9, would extend only along the lower portion of the rear end of the right side of butt grip segment 6.

The rear end embodiment of the butt grip shown in FIG. 10 is also canted or rotated to the left at its top, the same as the version of FIG. 9, except that the bottom of the rear end of the butt grip in FIG. 10 is given a generally triangular shape with inwardly inclined side walls 56 and 57 terminating at a curved bottom wall 58. The triangular bottom shape would streamline the rear end of the handle and contribute towards weight reduction In FIG. 11, the rear end of the butt grip is shown as having the same shape as that in FIGS. 8 and 9, except that the top of the rear end of the butt grip is rotated to the right at the rear end. Such a rear end shape, in combination with the laterally offset forward end of butt grip segment 6 would convolute or twist the butt grip segment of the handle along its length. The advantage of the rear end rotation to the right as shown in FIG. 11 would be possible mechanical improvement with a right hand casting grip. The rear end of the butt grip segment 6 would present itself in slightly closer conforming relation to the rear end of the right hand when casting.

FIG. 12 is a top, plan view of the improved handle of this invention showing a configuration quite similar to that of FIG. 1. The difference is that the butt grip segment 6a of handle 4 in FIG. 12 angles from right to left in a direction outwardly towards the reel seat over the entire length of the butt grip segment. This provides the desired lateral offset 28a at the forward end of the butt grip, which merges along juncture line 34a with a rearwardly and outwardly angled lateral offset 30a on the rear end of the reel seat segment on which palming reel 16a is mounted. The merger area 32a of the lateral offsets 28a and 30a is also preferably rounded as shown in FIG. 12 for comfort and conforming relation to the palm of the hand of the user. At the rear end, butt grip segment 6a is offset to the right with the fully angled butt grip segment. However, the right, rear side of the butt grip can be aligned with the rod shaft 2 by shaping it in a straight side wall as indicated in phantom lines by reference numeral 38a. Thus, the same benefits for right handed bait casting would be achieved as described above with respect to straight, right side wall 38 at the rear end of butt grip segment 6.

Figure 13:
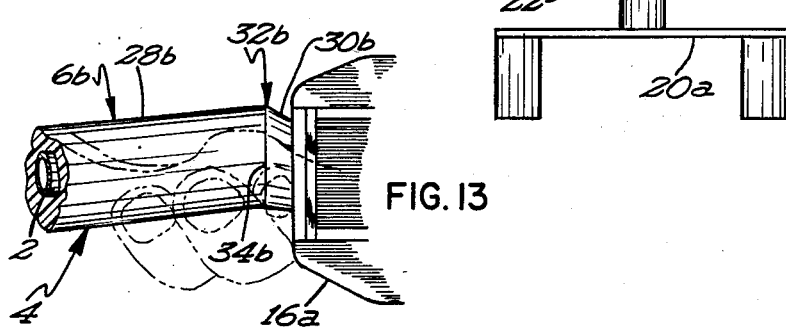
FIG. 13 is a fragmentary, top plan view similar to FIG. 12 showing a slightly different butt grip shape and construction.

In the fragmentary, top plan view of FIG. 13, butt grip segment 6b is also angled to the left in a horizontal plane along its entire length the same as butt grip segment 6a of FIG. 12. However, the laterally offset, angled side walls 28b and 30b of the butt grip segment and reel seat segment, respectively, are straight to their juncture line 34b. This provides a more pointed lateral offset 32b as shown.

It is to be noted that rod shaft 2 is shown extending rearwardly through butt grip segment 6b of handle 4 in FIG. 13. Rather than using a so-called blank-through rod and handle construction, the rod shaft may connect at its rear end to the front end of foregrip 10, without extending rearwardly into the reel seat segment and butt grip segment. Alternatively, the rod shaft 2 could extend into the reel seat segment 8 without extending rearwardly into the butt grip segment 6 or 6a. Conventional connection devices, such as a ferrule or other coupling means may be utilized to firmly secure the rear end of the rod shaft 2 to the front end of foregrip 10. When utilizing a pistol grip shaped butt grip 6a as shown in FIG. 14 in side elevation, with a rod shaft of the blank-through construction, the rear end of the rod shaft 2 would be at an elevated location on the rear end of the butt grip as shown in dotted lines in FIGS. 8-11.

FIGS. 12 and 14 depict rod and handle assemblies wherein the rod shaft connects to the front end of the handle, at the foregrip 10, in a nonblank-through construction.

In FIG. 16 there is illustrated an alternative embodiment of the laterally offset handle, wherein the butt grip segment 6c is offset laterally to the left along substantially its entire length. The left, offset side 28c of butt grip segment 6c extends straight and basically parallel to rod shaft axis 26 in alignment therewith. The left, rear side of the reel seat segment angles rearwardly and outwardly at 3c to provide a lateral offset on the rear end of the reel seat as well. The offset side walls 28c and 30c of the butt grip segment and reel seat segment intersect at a lateral offset 32c. The right side 36c of butt grip segment 6c also extends straight, in alignment with rod shaft 2 and its axis 26. The reel 16a shown in FIG. 16 is a specially contoured palming grip reel of the same type described with respect to FIGS. 12 and 14. On such a reel, the oil cap 22 is put on the right hand side to avoid interference with the left hand when palming the left side of the reel as shown in phantom lines in FIG. 16.

FIG. 17 shows an embodiment of the laterally offset handle 4 substantially the same as in FIG. 16, except that an indent 60 is provided on the left side 28c of butt grip segment 6c to accommodate the contour of the base of the thumb and the palm of the fisherman when utilizing a left hand palming grip. Indent 60 is preferably of concave shape with a slight curvature as shown in the top, plan view of FIG. 17.

FIGS. 18 and 19 show a different construction of rod shaft and handle wherein the reel seat segment 8d is formed from and integrally with the base end of the rod shaft 2a. The rod shaft 2a tapers outwardly at its rear or base end as shown in a construction sometimes referred to as a "fat butt" construction. The butt grip segment 6d is formed to the same basic shape as that shown with respect to butt grip segment 6 in FIG. 1 to provide a lateral offset on the left side of the handle portion of the assembly. Thus, the left side of butt grip segment 6d angles outwardly in a forward direction towards reel seat segment 8d to a juncture point of maximum lateral offset 32d with a laterally offset segment 30d at the left side of the rear end of reel seat segment 8d. Reel seat lateral offset 30d angles outwardly in a rearward direction, and may be formed as a component of the reel seat segment 8d or of the butt grip segment 6d. Alternatively, the angled, lateral offset 30d at the rear end of the butt grip segment could be a separate piece glued in place against the forward end of butt grip segment 6d and against the left, rear side of butt grip segment 8d. The rear end of the integral rod shaft 2a is threaded at 15 to receive a lock nut 14 for holding a reel 16 in place on the reel seat segment. FIG. 19 shows a structure very similar to that of FIG. 18 for the integral reel seat segment and rod shaft assembly. In the embodiment of FIG. 19, the lateral offset 30e at the rear end of the reel seat segment 8d tapers rearwardly from the reel seat towards lateral offset juncture 32d more gradually, at a smaller angle with respect to the rod shaft axis 26. The forward end of butt grip segment 6d, and the rear end of reel seat segment 8d in the area of the lateral offsets 28d and 30e is recessed or cut away at 66 to provide clearance space for a reel lock nut or hold down nut 64 on threads 62 formed on the rear end of reel seat segment 8d. Lock nut 64 is adjustable forwardly and rearwardly, in the same manner as lock nut 14 to secure the rear end of the foot of a reel in place on the reel seat.

Figure 20:
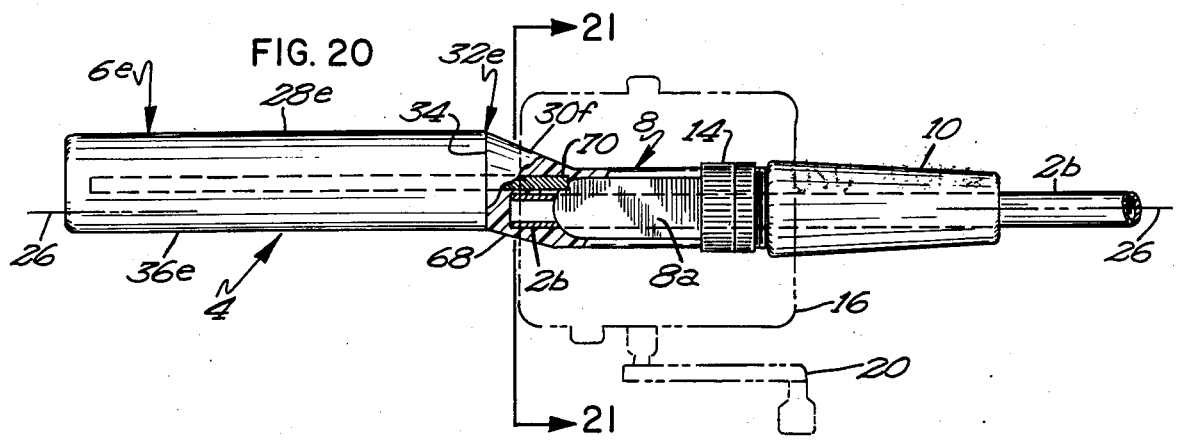
FIG. 20 is a top, plan view of another embodiment of the improved fishing rod handle showing a butt grip attachment shaft in combination with a rod shaft extending rearwardly into the reel seat segment of the handle.

A still different embodiment of the laterally offset handle is illustrated in FIG. 20 wherein an attachment shaft is utilized to secure the butt grip segment to the reel seat segment. In this rod and handle assembly, the rod shaft 2b extends rearwardly a substantial distance into the reel seat segment 8 as shown. Butt grip segment 6e is laterally offset to the left side of the reel seat segment 8 substantially along its entire length in alignment with rod shaft 2b and its axis 26 in a butt grip structure and configuration very similar to that illustrated with respect to butt grip 6c in FIG. 16. The left and right sides 28e and 36e, respectively, of butt grip segment 6e extend straight and parallel to rod shaft axis 26. At its forward end, butt grip segment 6e merges at juncture line 34 with a laterally offset reel seat segment having left and right side walls 30f and 68 at its rear end which angle outwardly in a rearward direction towards juncture point 32e with the forward end of butt grip segment 6e. An attachment shaft 70, which may be metal such as titanium, extends longitudinally through butt grip segment 6e as shown, and forwardly into the rear end of reel seat segment 8 in a direction generally parallel to rod shaft 2b. As is shown in the top view of FIG. 20, attachment shaft 70 is offset laterally to the left side of rod shaft 2 on the same side thereof as that on which butt grip segment 6e and the rear end of the reel seat segment are laterally offset. Attachment shaft 70 serves to secure butt grip segment 6e and reel seat segment 8 together. The use of such an attachment shaft 70 extending longitudinally within the handle between the butt grip segment and the reel seat segment permits the handle to be offset a greater distance laterally on the palming grip side, while still maintaining a strong handle construction.

Figure 21:
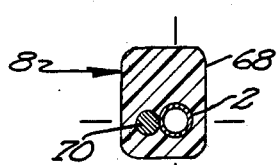
FIG. 21 is a vertical, section view taken along lines 21—21 of FIG. 20.
Figure 22:
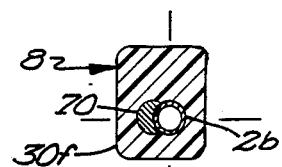
FIG. 22 is a vertical, section view through the reel seat of the handle, and taken at the same location as FIG. 21, but with a different attachment shaft configuration.

FIG. 21 illustrates the lateral disposition of attachment shaft 70 and the rear end of rod shaft 2b with respect to each other. Those two shafts can actually abut each other as shown in FIG. 21 or be separated by a short distance as shown in the top view of FIG. 20. In FIG. 22, an alternative embodiment is shown wherein the right side of the attachment shaft 70 is formed of a concave shape to closely conform to and abut against the rear end of rod shaft 2b.

Figure 23:
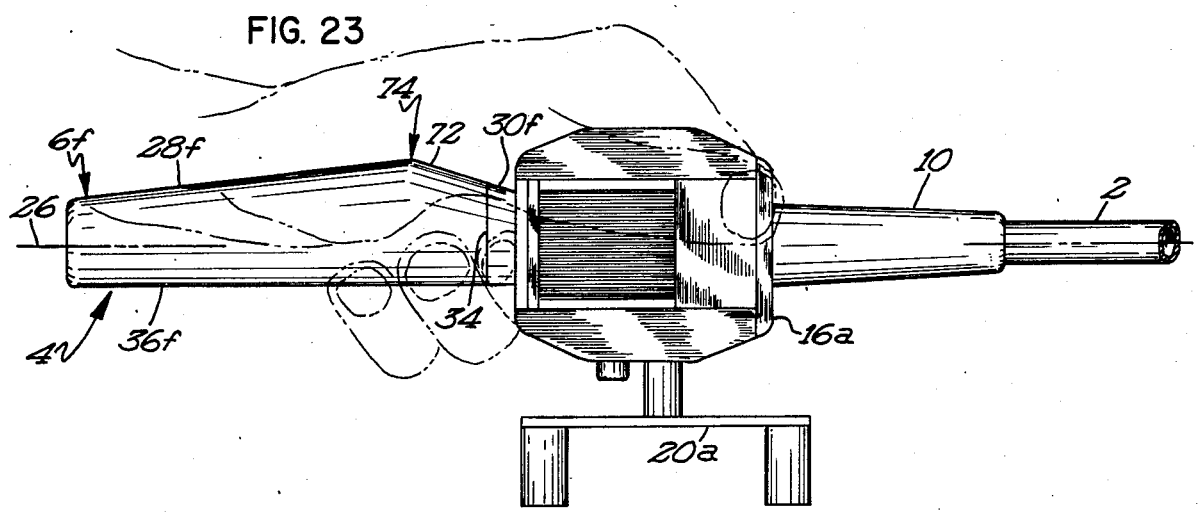
FIG. 23 is a top, plan view of an alternative embodiment showing a different lateral offset contour on the butt grip and reel seat.

In FIG. 23, there is shown a further embodiment of the laterally offset handle having a butt grip segment 6f which tapers forwardly and outwardly from the rear end of the butt grip towards the left side of the reel and reel seat. Side wall 28f terminates at a point 74 of maximum lateral offset at a forward location thereon. At its front end, the side wall 72 of butt grip segment 6f tapers or inclines inwardly from maximum lateral offset point 74 towards the rear end of the reel seat segment. Forwardly and inwardly inclined side wall 72 of the butt grip merges along juncture line 34 with a rearwardly and outwardly angling side wall 30f of a reel seat which is offset laterally to the left at its rear end. The inclined side walls 28f and 72 on the left side of the butt grip segment define a large included angle forming a gentle, lateral outward projection which conforms to the palm and hand of the user in the left hand palming grip position as shown in phantom lines in FIG. 23. The entire right side 36f, of butt grip segment 6f extends straight, in parallel alignment with rod shaft 2 and its axis 26.

Figure 24:
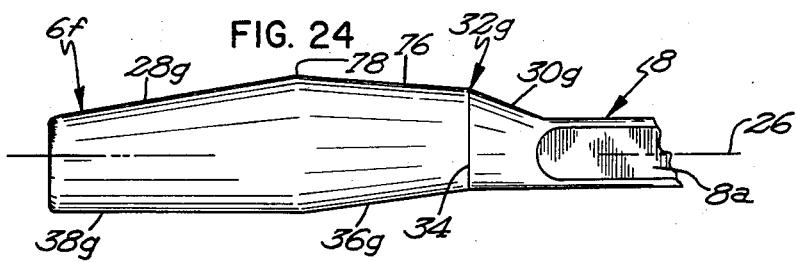
FIG. 24 is a fragmentary, top plan view similar to FIG. 23 and showing a different configuration of a laterally offset butt grip in combination with a laterally offset reel seat.

The handle embodiment shown in FIG. 24 is very similar to that of FIG. 23. Again, the butt grip segment 6g angles or tapers outwardly in a forward direction along its left, rear side wall 28g to a point 78 of maximum lateral displacement, from which it tapers inwardly in a forward direction towards the reel seat segment 8 along forward side wall 76. Reel seat segment 8 is laterally offset at its rear end where it merges along juncture line 34 with the forward end of the butt grip segment. The left, rear side 30g of reel seat segment 8 angles rearwardly and outwardly to the juncture point 32g with butt grip segment 6g. The right side of the butt grip segment is straight along its right, rear side wall 38g, and angles inwardly along its right, forward side wall 36g in a manner similar to that disclosed on the right side of the butt grip segment 6 of FIG. 1.

Figure 25:
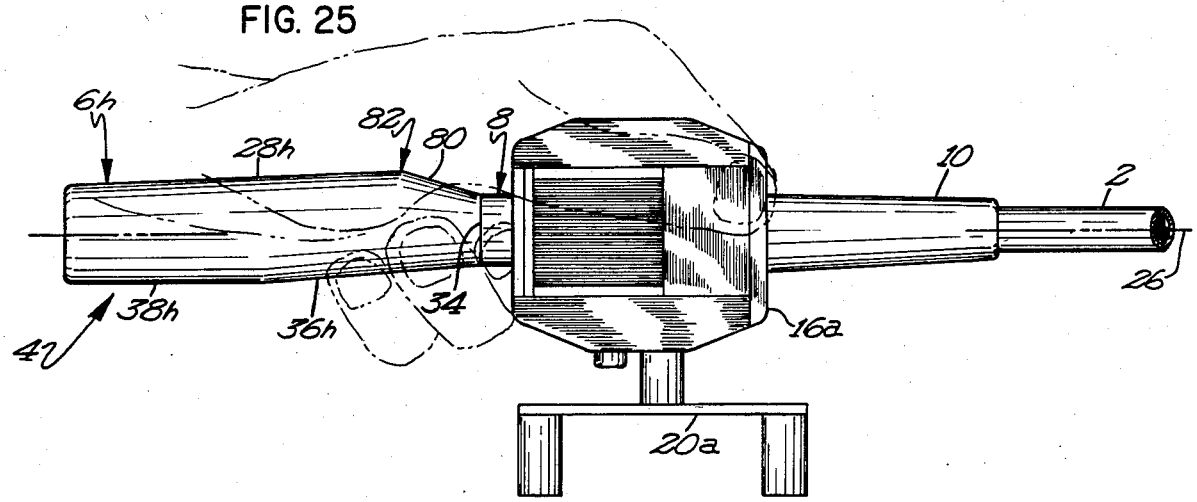
FIGS. 25, 26, and 27 are top, plan views of still another embodiment of a laterally offset butt grip in combination with a reel seat segment which is centered on the rod shaft axis.
Figure 26:
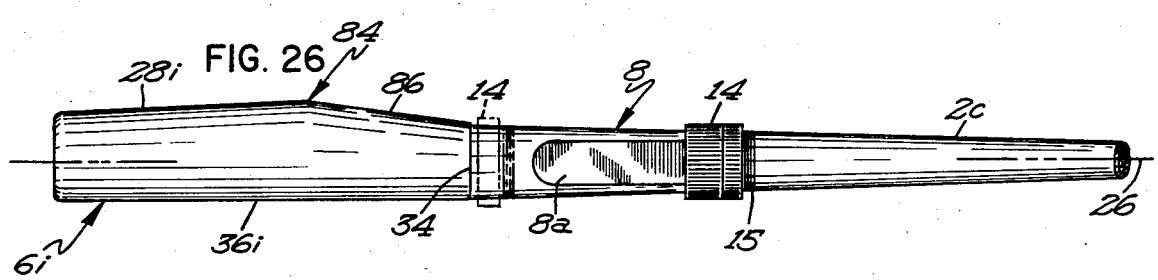
Figure 27:
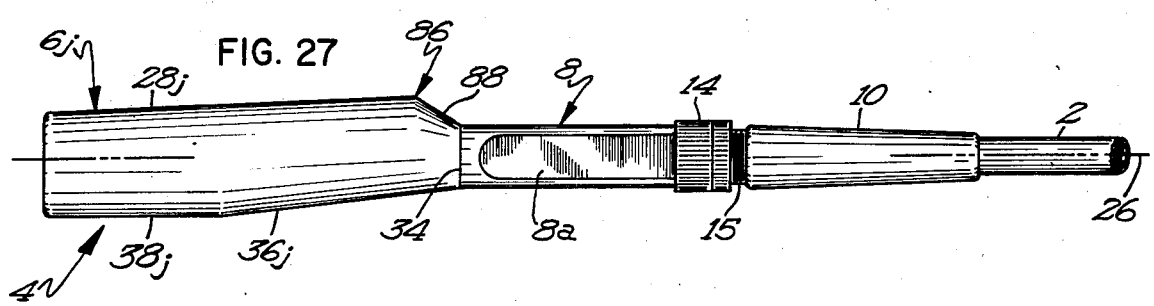

FIGS. 25, 26, and 27 illustrate embodiments of the handle on which only the butt grip segment of the handle is laterally offset. In these versions, the reel seat segment is not laterally offset, but is centered on the rod shaft. It is not necessary to have both the reel seat segment and the butt grip segment laterally offset. Substantial improvements in mechanical advantages and comfort as described herein may be obtained by laterally offsetting only the butt grip segment of the handle, at least along its forward end. In the embodiment of the handle shown in FIG. 25, the butt grip segment 6h is laterally offset in an angular configuration on its left side substantially the same as that shown in FIG. 23, and its right side conforms generally to the configuration of the right side of the butt grip segment shown in FIG. 24. Thus, the left, rear side 28h of the butt grip segment angles outwardly in a forward direction to a point of maximum lateral offset at 82, from which it angles or tapers inwardly to its juncture line 34 with the rear end of butt grip segment 8. Reel seat segment 8 is centered at its rear end at rod shaft axis 26, and is not laterally offset. On its right side, butt grip segment 6h is straight along its right rear side 38h, and tapers inwardly towards the left side of the handle and reel 16a along its right forward side wall 36h.

The handle embodiment illustrated in FIG. 26 incorporates a laterally offset butt grip segment 6i which merges at its forward end with the rear end of a reel seat segment 8 which is also centered on axis 26 of rod shaft 2c. In this embodiment, as in the embodiment of FIG. 2c, the reel seat segment 8 is formed integrally on the rear or base portion of a rod shaft 2c which tapers outwardly and becomes wider at its rear end. Reel seat 8a is formed on the widened rear end of rod shaft 2c. Threads 15 are also provided on the base end of the rod shaft to accommodate a reel locking nut 14. Alternatively, the threads and lock nut 14 may be provided at the rear end of reel seat segment 8 as shown in phantom lines. But grip segment 6i tapers outwardly from its rear end on its left, rear side 28i to a point 84 of maximum lateral displacement, from which it tapers and angles inwardly along its forward side wall 86 towards the rear end of butt grip segment 8. In this version, the right side 36i of the butt grip segment is straight and parallel along its entire length to rod shaft axis 26. As noted, the rear end of reel seat segment 8 where it merges with the forward end of butt grip segment 6i at 34 is centered on the rod shaft axis 26.

In FIG. 27, the butt grip segment 6j is again laterally offset on its left side utilizing an outwardly angled left, rear side wall 28j. Wall 28j extends forwardly over the greater part of the length of the butt grip segment and terminates at a point 86 of maximum lateral offset on the left side of reel seat segment 8. From that point, the left side of the butt grip segment angles inwardly quite abruptly along forward side wall 88 to its juncture line 34 with the rear end of reel seat segment 8. This embodiment places the point 86 of maximum lateral displacement of the butt grip segment of the handle in close proximity to the rear end of reel seat segment 8. Again, as in FIGS. 25 and 26, the rear end of reel seat segment 8 is centered on axis 26 of rod shaft 2. In this embodiment, the right side may take any desired configuration. As shown, the right, rear side wall 38j is straight, and the right, forward side wall 36j angles inwardly towards the rear end of reel seat segment 8, this right side wall configuration being very similar to that shown in FIG. 25.

Figure 28:
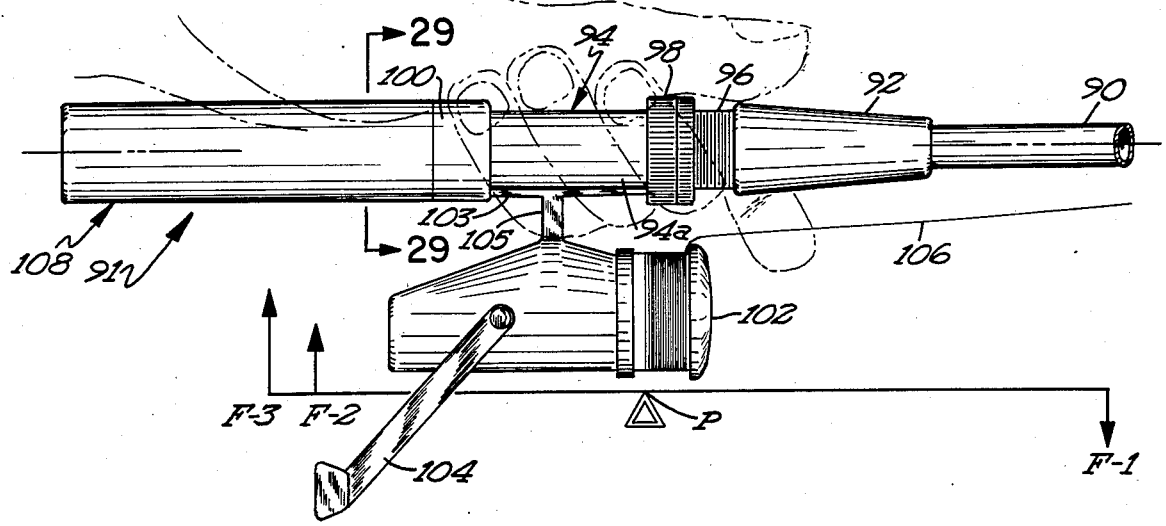
FIG. 28 is a side, elevation view of a spinning rod and handle assembly, with a spinning reel in place, and illustrating diagramatically the leveraged forces acting on the rod and handle.

Inadequate grip conformity to the fishing rod handle and inadequate grip contact and leverage to resist leveraged upward rod forces on the handle are lesser but similar problems with spinning rod and reel assemblies. Such a spinning rod and reel assembly is shown in FIG. 28. A spinning rod 90 is shown assembled on a handle generally indicated by reference numeral 91. As is common practice on spinning rod assemblies, the rod 90 may extend rearwardly through foregrip 92, reel seat segment 94, and longitudinally within butt grip segment 108. However, it is also possible to have a spinning rod with the rod secured at the front end of the handle to foregrip 92, and not extending rearwardly through the reel seat and butt grip. The spinning rod handle 91 further comprises a threaded segment 96 at the forward end of reel seat segment 94, on which a reel locking nut 98 is threadedly adjustable forwardly and rearwardly. A locking ring 100 is secured around the rear end of the reel seat segment 94. A spinning reel 102 having a right hand crank handle 104 is provided with a base foot 103. The open face spinning reel 102 is normally mounted on the underside of reel seat segment 94 as shown in FIG. 28, against a downwardly facing reel seat 94a. The opposite ends of reel mounting foot 103 are extended under locking ring 103 and lock nut 98, with nut 98 being threaded to the left as viewed in FIG. 28 to securely fasten the reel in place.

The line 106 is fed from the forward end of the spinning reel 102 as indicated in FIG. 28. A bail (not shown) would normally be utilized on the reel 102 to control the release of line 106.

The user's hand is shown in phantom lines in FIG. 28 in the normal position for gripping a spinning reel with the left hand, on a right hand crank reel. In such a gripping position, the user's hand grips the butt grip segment 108 at the forward end thereof, the reel seat and the reel stem 105 which supports the reel 102 from its mounting foot or base 103. The palm of the hand would normally be positioned more forwardly on the handle than with bait casting and spin casting rods. The fingers encircle the bottom of the handle, to engage the reel seat 94a. Line control is normally accomplished with the forefinger. The forefinger is used to catch and control the line 106 when casting, as is indicated in FIG. 28.

As with bait casting and spin casting rods, the gripping of the handle creates a pivot point P, about which leveraged rod forces act. Thus, the downward forces acting on the rod tip indicated diagramatically in FIG. 28 by force line F-1, act through a lever arm extending from the rod tip back to pivot point P. The upward reaction forces against the handle as indicated by force lines F-2 and F-3 act along a lever arm rearwardly at pivot point P. Because the spinning rod user's index finger extends downwardly away from the rod handle to contact the manipulate the fishing line, the user's index or forefinger is not fully in gripping contact with the handle. This results in a shortened user grip on the spinning rod handle. Thus, the user grip induced rod lever pivot point P is moved rearwardly. Thus, the lever arm for the downward rod force F-1 is increased, while the upwardly acting forces on the handle act through a shortened lever arm. The downward resistance of the user's hand, particularly the palm and rear end of the hand on the top of the handle in resisting the upward forces on the handle, thus act through a shortened lever arm about pivot point P, which makes it more difficult to resist the downward forces F-1 acting on the front end of the rod through an increased lever arm.

This increases the tendency of the spinning rod handle to slip upwardly out of the user's hand, particularly when strong downward forces are encountered on the rod, as when handling a fish.

Figure 29:
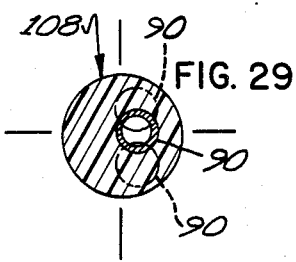
FIG. 29 is a vertical, section view through the butt grip segment of the handle of FIG. 28 and taken along lines 29—29 thereof.
Figure 30:
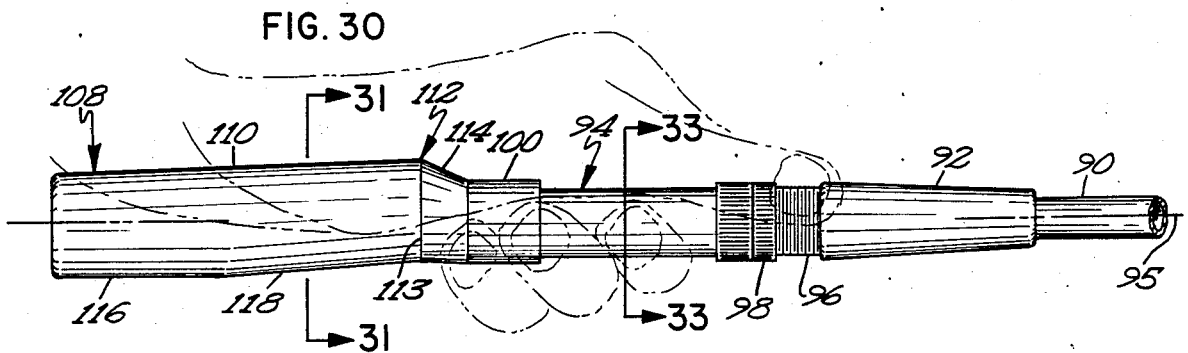
FIG. 30 is a top, plan view of the spinning rod embodiment of FIG. 28 showing a laterally offset butt grip.
Figures 31, 32:
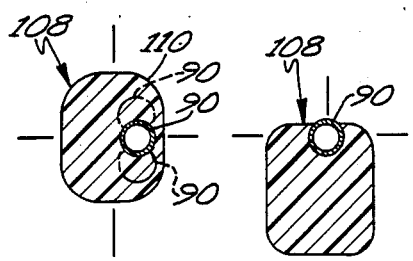
FIG. 31 is a vertical, section view through the butt grip segment of the handle of FIG. 30, and taken along lines 31—31 thereof.
FIG. 32 is a vertical section view taken at the same location as FIG. 31 and showing an alternative embodiment of the cross section of the butt grip segment of the handle and of the rod shaft location therein, with the rod shaft being exposed at the top of the butt grip.

The portion of the handle 91 which is engaged by the user's hand on the spinning rod and handle assembly may be offset laterally to the left, as shown in FIG. 30, to provide the same mechanical advantages and comfort as described above with respect to bait casting and spin casting rod and reel assemblies. Thus, as is shown in FIG. 30, the butt grip segment 108 may angle outwardly to the left along its left side wall 10 to a point 112 of maximum lateral offset, from which it tapers inwardly and forwardly along angled side wall 114 to a merger junction 113 with the rear end of reel seat segment 94. In such an embodiment, the reel seat segment is not laterally offset, and is centered at its rear end, as well as along its entire length on the longitudinal axis 95 of spinning rod shaft 90. The butt grip segment 108 may have a straight, right rear section 116 and an inwardly tapered wall segment 118 at its forward end in a configuration similar to that of Fig. FIG. 29 shows the lateral offset of the forward end of butt grip segment 108 with respect to rod shaft 90. The rod shaft 90 may also be given different vertical locations within the handle, as indicated in phantom lines in FIG. 29. In that figure, the butt grip segment is shown as having a circular or round cross section. FIGS. 31 and 32 illustrate alternative, rectangular cross sections for the butt grip segment. In any of the variations of the cross sectional shape of the butt grip segment described with respect to FIGS. 2-7 for bait casting and spin casting handles, can also be utilized on the handles of spinning rods. FIG. 31 shows a rectangular cross section for the butt grip segment having rounded corners 110.

FIG. 32 shows an alternative embodiment of the butt grip segment of the handle wherein the butt grip is offset downwardly so as to elevate the rod shaft 90 and expose at least a portion of the rod shaft at the location of section lines 31—31. Thus, the rod shaft will be exposed on the top surface of the butt grip where it would be in direct contact with the palm and rear end of the user's hand where the maximum force is exerted downwardly by the hand to resist the leveraged upward rod forces on the handle. This greatly increases sensitivity of the user to forces and vibrations on the rod 90.

Figures 33, 34:
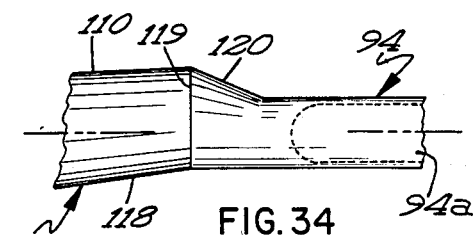
FIG. 33 is a vertical, section view through the reel seat segment of the handle of FIG. 30, showing the rod shaft exposed at the top of the reel seat.
FIG. 34 is a fragmentary, top plan view of a spinning rod and handle assembly, similar to FIG. 30, but showing a laterally offset butt grip merging with a reel seat which is laterally offset at its rear end.

In FIG. 33, the cross section of reel seat segment 94 is shown as being circular, with the rod blank exposed on the top of the reel seat segment. Here again, the contact of the user's hand with the exposed rod blank 90 in the reel seat area enhances sensitivity to vibrations on the fishing rod.

The lateral offset on the forward end of the butt grip segment 108 as shown in FIG. 30 at 110, 112, 114 puts more of the user's hand in firm, gripping contact with the butt grip, and especially on the top surface thereof. The palm of the user tends to bulge out laterally somewhat when grasping and squeezing the handle with the hand in the gripping position as shown in phantom lines in FIGS. 28 and 30. The lateral offset to the left as viewed in FIG. 30 helps conform the handle to the shape the user's hand assumes. Thus, the user is better able to resist upward leveraged forces on the rod handle.

With respect to FIG. 33, it is to be noted that having the rod shaft 90 exposed in the area of the reel seat segment, is particularly advantageous on spinning rod and handle assemblies In contrast with bait casting and spin casting rod and handles, the user's hand is in direct contact with the top of the reel seat segment on spinning rods, as shown in FIGS. 28 and 30. Thus, sensitivity to rod vibrations can be particularly increased on spinning rods by exposing the rod in the top of the reel seat area.

The reel seat segment 94 may also be laterally offset to compliment the lateral offset on the butt grip, in the same general manner as described above with respect to the various embodiments of bait casting and spin casting rod and handle assemblies. FIG. 34 shows such an embodiment on a spin casting handle. The reel seat segment 94 is laterally offset to the left at its rear end. The offset 120 angles outwardly in a rearward direction to the juncture line 119 where the butt grip segment 108 and reel seat segment 94 merge.

It is to be noted that spinning reels are available with cranks on either side for either right hand or left hand cranking of the reel. A reel with a right hand crank 104 has been shown in FIG. 28. The gripping of the rod handle would thus be with the left hand as shown in phantom lines in FIGS. 28 and 30. For reels with a left hand crank, the handle would be grasped with the right hand, and the lateral offset of the type shown in FIG. 30 would be reversed. Thus, the lateral offset would be to the right hand side as viewed in the top view of FIG. 30, with the crank on the left side of the reel.

Figure 35:
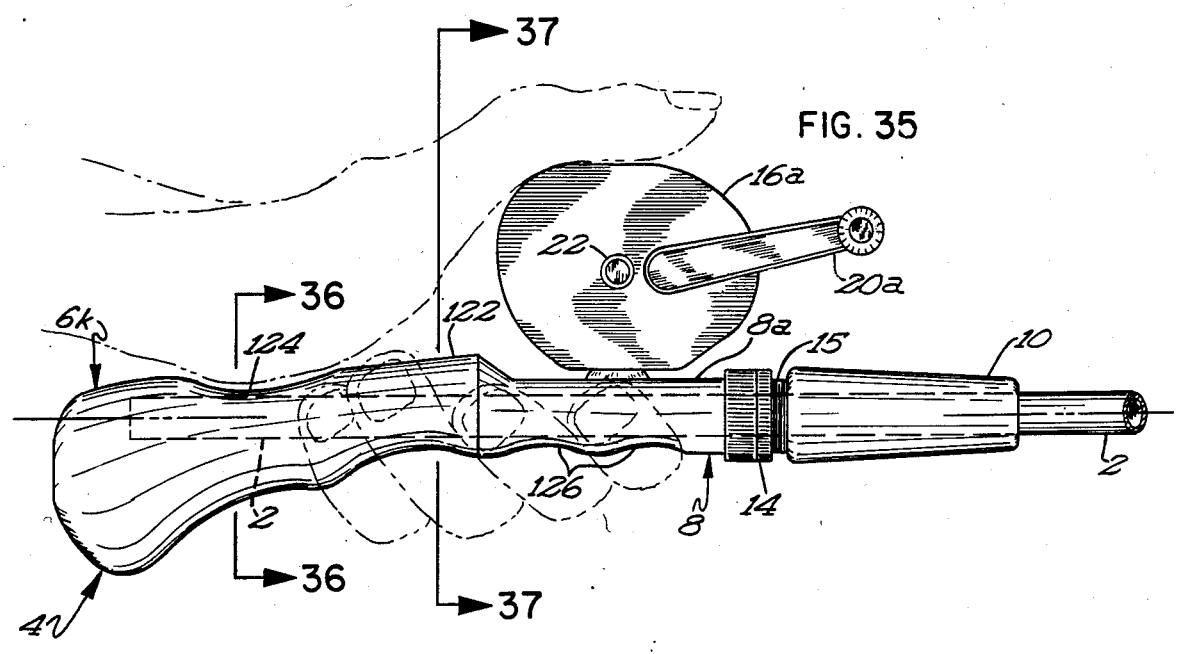
FIG. 35 is a side elevation view of a casting rod, handle and reel assembly embodying the concepts of this invention, similar to the embodiment of FIG. 14, and with no trigger on the reel seat segment.
Figures 36, 37, 38, 39:
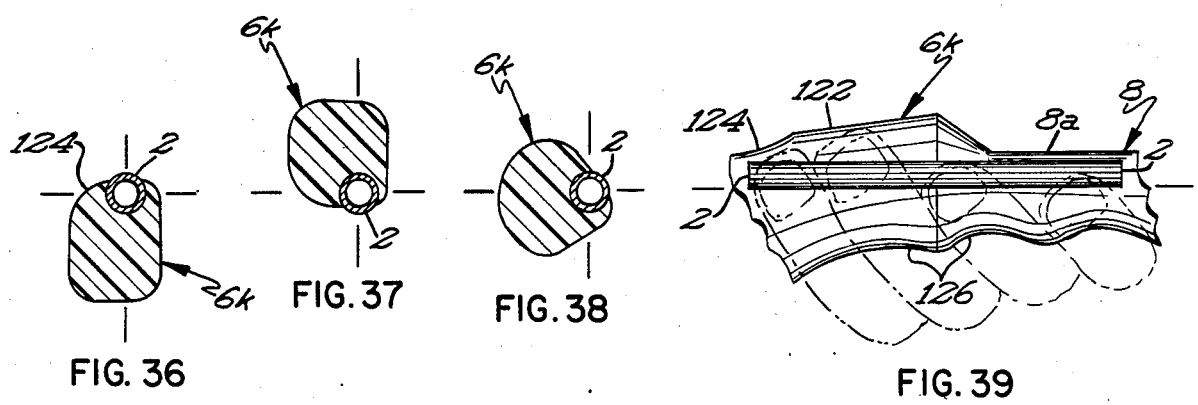
FIG. 36 is a vertical section view through the butt grip segment of the handle of FIG. 35, taken along lines 36—36 thereof, and showing the rod shaft exposed at the top of the butt grip.
FIG. 37 is a vertical, section view through the forward end of the butt grip segment of the handle taken along lines 37—37 of FIG. 35, and showing the rod shaft exposed at the bottom of the butt grip.
FIG. 38 is a vertical, section view taken at the same location as FIG. 37 and showing a different butt grip cross sectional configuration, which has been canted to its offset side, and which provides an exposed rod shaft on the opposite side of the offset butt grip.
FIG. 39 is a fragmentary, side elevation view of an embodiment similar to that of FIG. 35, but showing the rod shaft exposed along the side of both the forward end of the butt grip segment and on the reel seat segment.

The handle embodiment shown in FIG. 35 in side elevation illustrates a pistol grip handle which is laterally offset to the left, and which further has the rod shaft 2 extending through the reel seat segment and into the butt grip segment in such a way that the rod shaft is exposed in the butt grip segment. A palming grip reel 16a is shown in place on the reel seat segment 8a, and the user's hand is shown in phantom lines in the left hand palming grip position. As shown in FIGS. 35 and 36, the rod shaft 2 extends longitudinally through the handle 4 through both the reel seat segment and a major portion of the butt grip segment 6k. The handle incorporates a foregrip 10 forwardly of the reel seat segment 8, and a locking nut 14 threadedly adjustable on the reel seat segment 8. The palming reel 16a is shown positioned on top of the reel seat 8a. With a handle 4 having such a pistol grip configuration, the forward end of the butt grip segment 6k is elevated at 122 in an upwardly offset manner above rod shaft 2. This reduces the thumbing distance to the top of the reel 16a from the top surface of the butt grip segment 6k. Also, the top surface of butt grip segment 6k is indented downwardly, preferably in the form of a smoothly curved, concave surface 124 to provide a resting surface for the base end of the thumb of the user. Smoothly curved indentations 126 are also provided on the underside of reel seat segment 8 and butt grip segment 6k for improved gripping by the fingers of the user in the palming grip position. In the embodiment of FIG. 35, no trigger is provided on the bottom of the reel seat segment 8 as is conventional with pistol grip handles. Such a trigger, as shown at 40 in FIG. 14, actually interferes with the palming grip. Although a reel seat trigger assists when casting, it is a detriment when palming the handle and reel for retrieving a lure or playing a fish.

All embodiments of the laterally offset handle disclosed herein improve sensitivity to rod forces and vibrations by placing more of the user's hand in direct contact with the handle, in the palming grip position. In the embodiment shown in FIGS. 35, 36, and 37, the ability of the fisherman to feel gentle rod vibrations and subtle leveraged, upward rod forces on the handle is significantly enhanced by exposing the rear end of the rod shaft 2 at the top surface of the butt grip segment 6k in the area of the concave indent 124, as shown in FIGS. 35 and 36. Since it is the base of the user's thumb and the rear portion of the hand which most directly and firmly contacts the top surface of the butt grip in resisting upward leveraged rod forces on the handle, sensitivity to rod vibrations is particularly improved by exposing the rear end of the rod shaft at that location, on rod and handle assemblies of so-called blank-through construction.

As shown in the section view of FIG. 37, the butt grip segment 6k is so angled and shaped at its forward end with respect to rod shaft 2, that the rod shaft 2 is also exposed at the bottom surface of the forward end of the butt grip segment 6k. One or more of the fingers of the user's hand would thus be in contact with the rod shaft at that location to further enhance sensitivity.

FIG. 38 illustrates an alternative embodiment of the cross sectional shape of the forward end of the butt grip at the location of section lines 37—37. In this version, the butt grip segment could have a generally triangular shape at its forward end and be canted or rotated to the left about the axis of rod shaft 2, as shown. When this is done, the rod shaft 2 would be exposed on the right, forward side of the butt grip segment to increase sensitivity.

The fragmentary, side elevation view of FIG. 39 illustrates a handle of the blank-through construction wherein the rod shaft or blank 2 is exposed along the right forward side of the butt grip segment 6k, as well as on the right side of the reel seat segment 8. The rod shaft would be exposed at such locations on a handle formed and oriented in the manner illustrated in FIG. 38. Thus, the end extremities of four fingers of the user would be in contact with the exposed rod shaft along the side of both the reel seat segment and the forward end of the butt grip segment, as illustrated in phantom lines in FIG. 39.

It is noteworthy that all versions of the laterally offset handle disclosed herein, wherein the right, forward side of the butt grip segment is tapered or angled inwardly towards the rod shaft greatly enhances sensitivity by providing a reduced wall thickness on the right side of the forward end of the butt grip. Sensitivity is of course improved in such a manner only on rod and handle constructions wherein the rod shaft extends through the reel seat segment and rearwardly into the butt grip segment.

Figure 40:
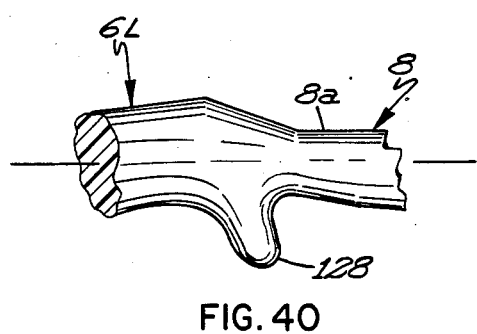
FIG. 40 is a fragmentary, side elevation view of the forward end of the butt grip and of the merging reel seat segment of a fishing rod handle in a configuration similar to that of FIG. 35, but showing a palming style trigger on the bottom of the reel seat segment.

In FIG. 40, there is shown a fragmentary, side elevation view of a handle embodiment wherein the butt grip segment are formed out of the same material in a unitary construction. Thus, as shown in FIG. 40, the butt grip segment 61 is integrally formed with the forwardly disposed reel seat segment 8 having a reel seat 8a. Also, a short, stubby trigger 128 may be utilized as shown in FIG. 40 to minimize interference with the hand of the user when applying the palming grip, yet still provide the additional leverage and gripping power provided by a trigger when casting. Any of the laterally offset butt grip and reel seat embodiments disclosed herein may be formed on such a integrally manufactured butt grip and reel seat handle.

With respect to handles which do employ a trigger, as shown at 40 in FIG. 14, one, two, or three fingers of the user may be placed forward of the trigger, under the reel seat area. One of the reasons for the palming grip position is to move the user's grip forwardly on the rod handle. This places more of the user's hand under the reel, thereby balancing the weight of the reel on the rod and handle, and reducing the tendency of the reel to cause a downward tipping force acting against the user's hand. Also, moving the grip forwardly on the handle in the palming position moves the pivot point P slightly forward towards the tip of the rod, as viewed in FIG. 14. This slightly reduces the lever arm for the force F-1 acting downwardly on the front end of the rod. The palming grip is improved and stabilized in all embodiments disclosed herein by the lateral offset of the handle in the gripping area.

Leveraged upward rod forces impact the user's grip and hand most severely on one hand butt grips, which are relatively short. Such leveraged upward rod forces impact the user grip, but with less severity, on two handed butt grips, or on handles with longer butt grips. The user can better resist upward forces with the greater mechanical advantage available from a two handed grip. However, leveraged upward rod forces are still a problem on such longer butt grips, particularly for the forward hand grip closer to the reel seat. The laterally offset butt grip structures disclosed herein would provide enhanced mechanical advantages and greater comfort on such longer handles, particularly at the forward end thereof where the forward hand grip is positioned.

In the embodiments of FIGS. 2-7, the cross section of the forward end of the butt grip segment is shown as being generally symmetrical. Nonsymmetrical cross sectional shapes, as shown in FIGS. 36-38 may be utilzied, while still retaining the benefits of the laterally offset handle construction.

It is anticipated that various changes may be made in the construction, shape, and orientation of the fishing rod handle and rod assemblies disclosed herein, without departing from the spirit and scope of the invention as defined by the following claims:

What is claimed is:

1. A fishing rod and handle assembly comprising:
   a rod shaft;
   an elongated handle secured to said rod shaft;
   a reel seat segment on said handle having a reel seat thereon;
   a butt grip segment on the rear end of said handle behind said reel seat segment, said butt grip segment being laterally offset from the longitudinal, central axis of said rod shaft, at least at a forward location on said butt grip segment behind said reel seat segment, towards the opposite side of said reel seat from that on which the crank of a reel mounted on said reel seat will be located.

2. A fishing rod and handle assembly as defined in claim 1 wherein:

at least at said forward location on said butt grip segment, said butt grip segment is of curvilinear shape on its outer surface as viewed in a cross sectional plane extending generally perpendicular to said rod shaft axis.

3. A fishing rod and handle assembly as defined in claim 1 wherein:
at least at said forward location on said butt grip segment, said butt grip segment is of generally rectangular shape as viewed along a cross sectional plane extending generally perpendicular to said rod shaft axis, with said rectangular cross sectional shape being elongated in a vertical direction when the rod and handle assembly is positioned horizontally, and the forward portion of said butt grip comprising said laterally offset forward location is canted in a direction towards said opposite side of said reel seat.

4. A fishing rod and handle assembly as defined in claim 3 wherein:
said generally rectangular, cross sectional shape of said rod shaft has curved corners at least at the upper end thereof, whereby a curved corner will be canted towards said opposite side of said reel seat in position to be snugly received within the palm of the user's hand to thereby cause the user's hand to wrap around said butt grip segment with more of the user's hand positioned on upper surfaces thereof.

5. A fishing rod and handle assembly as defined in claim 1, and further comprising:
a reel mounted on said reel seat, said reel having a crank on one side thereof for crank winding of the reel, and wherein said butt grip segment is laterally offset towards the opposite side of said reel.

6. A fishing rod and handle assembly as defined in claim 1 wherein:
said rod shaft extends through said reel seat segment and into said butt grip segment and is received and contained therein.

7. A fishing rod and handle assembly as defined in claim 1 wherein:
said butt grip segment of said handle is offset upwardly from the longitudinal, central axis of said rod shaft, at least at said forward location on said butt grip segment behind said reel seat segment to elevate said butt grip segment at said location, whereby the thumb to reel spool distance is reduced to facilitate thumbing control of a casting reel on top of said reel seat.

8. A fishing rod and handle assembly as defined in claim 1 wherein:
said butt grip segment is angularly disposed along a forward portion thereof with respect to said rod shaft axis and angles outwardly in a forward direction toward said reel seat segment away from said rod shaft axis in a horizontal plane so as to provide said laterally offset butt grip segment at said forward location thereon.

9. A fishing rod and handle assembly as defined in claim 8 wherein:
the side of said butt grip segment which is disposed on said opposite side of said reel seat angles outwardly and forwardly from its rear end towards said reel seat segment along substantially the entire length of said butt grip segment.

10. A fishing rod and handle assembly as defined in claim 8 wherein:
said butt grip segment has a reduced wall thickness on the opposite side thereof from which it is laterally offset, at said forward location thereon, whereby with the user's hand engaging the butt grip segment at said laterally offset location, and with the user's fingers curled under and around the reel seat segment and the adjacent forward end portion of said butt grip segment, the user's fingers will be positioned at least partially on top of the butt grip to effectively resist and control leveraged upward rod forces resulting from forward and downward pulling forces on the rod tip.

11. A fishing rod and handle assembly as defined in claim 8 wherein:
the rear end of said reel seat segment is laterally offset from said rod shaft axis on the same side of said reel seat segment as said butt grip segment and intersects the forward end of said butt grip segment.

12. A fishing rod and handle assembly as defined in claim 11 wherein:
said laterally offset butt grip segment and said laterally offset reel seat segment are radiused to form a curved surface along their juncture area of intersection.

13. A fishing rod and handle assembly as defined in claim 8 wherein:
said butt grip segment is angularly disposed along substantially the entire length thereof with respect to said rod shaft axis, in a horizontal plane, whereby said forward portion of said butt grip segment is offset towards the opposite side of said reel seat from that on which the crank of a reel mounted on said reel seat will be located, and the rear end of said butt grip segment is offset laterally in the opposite direction.

14. A fishing rod and handle assembly as defined in claim 8 wherein:
at least a portion of the rear end of said butt grip segment along the side thereof opposite that to which it is laterally offset is straight, and substantially in alignment with said rod shaft axis, thereby increasing casting grip leverage and efficiency.

15. A fishing rod and handle assembly as defined in claim 8 wherein:
the rear end of said butt grip segment is centered on said rod shaft axis, when viewed from the top.

16. A fishing rod and handle assembly as defined in claim 1 wherein:
at least at a forward location on said butt grip segment, the side of said butt grip segment opposite that on which it is laterally offset is beveled to provide an inclined surface in a plane generally parallel to said rod shaft axis, thereby facilitating the positioning of the end extremities of the user's fingers further around the top surface of said butt grip segment to more effectively resist leveraged upward rod forces on said butt grip segment.

17. A fishing rod and handle assembly as defined in claim 1 wherein:
at least at said forward location on said butt grip segment, said butt grip segment is rotated towards said opposite side of said reel seat about said rod shaft axis so as to cant said forward end of said butt grip segment towards said lateral offset, whereby the top surface of said butt grip segment is more laterally offset than the bottom surface thereof.

18. A fishing rod and handle assembly as defined in claim 1 wherein:

said butt grip segment is laterally offset from the longitudinal, central axis of said rod shaft towards the opposite side of said reel seat from that on which the crank of a reel mounted on said reel seat will be located, along substantially the entire length of said butt grip segment.

19. A fishing rod and handle assembly as defined in claim 18 wherein:

the rear end of said reel seat segment is laterally offset from said rod shaft axis on the same side of said reel seat segment as said butt grip segment and merges with the forward end of said butt grip segment.

20. A fishing rod and handle assembly as defined in claim 18 wherein:

the entire side of said butt grip segment, on the same side of the reel seat as that on which the crank of a reel mounted on the reel seat will be located, is substantially straight and parallel to said rod shaft axis.

21. A fishing rod and handle assembly as defined in claim 1 wherein:

the side of said butt grip segment which is disposed on said opposite side of said reel seat angles outwardly, away from said rod shaft axis, in a direction extending from the rear of said butt grip segment towards said reel seat and terminates at a point of maximum lateral offset at said forward location thereon, with the front end of said butt grip segment tapering inwardly towards said rod shaft axis in a direction from said point of maximum offset towards a juncture with the rear end of said reel seat.

22. A fishing rod and handle assembly as defined in claim 21 wherein:

the rear end of said reel seat segment is centered on said rod shaft axis at said juncture with the front end of the butt grip segment.

23. A fishing rod and handle assembly as defined in claim 21 wherein:

the rear end of said reel seat segment is laterally offset from said rod shaft axis on the same side of said reel seat segment as said butt grip segment and merges with the front end of said butt grip segment at a laterally offset location with respect to said rod shaft axis.

24. A fishing rod and handle assembly as defined in claim 1 wherein:

said butt grip segment is laterally offset towards said opposite side of said reel seat along substantially the entire length of said butt grip segment, with the front end of said butt grip segment on said laterally offset side thereof tapering inwardly towards the reel seat and merging with the rear of said real seat segment.

25. A fishing rod and handle assembly as defined in claim 24 wherein:

the rear end of said reel seat segment is centered on said rod shaft axis where the forward end of said butt grip segment merges therewith.

26. A fishing rod and handle assembly as defined in claim 6 wherein:

said rod shaft extends adjacent to the top surface of said butt grip segment along at least a portion thereof, and said rod shaft is exposed on the top of said butt grip for contact with the inside of the user's hand to enhance sensitivity to vibrations and movement of said rod shaft.

27. A fishing rod and handle assembly as defined in claim 6 wherein:

said rod shaft extends adjacent to the side wall surface of said butt grip segment along at least a portion of the forward end thereof on the side of said butt grip segment opposite that to which it is laterally offset, with said rod shaft being exposed on said side of said butt grip segment for contact with the user's fingers.

28. A fishing rod and handle assembly as defined in claim 1 wherein:

an attachment shaft extends within and between said butt grip segment and said reel seat segment as a means for securing said segments to each other.

29. A fishing rod and handle assembly as defined in claim 28 wherein:

said rod shaft extends longitudinally within said reel seat segment, and said attachment shaft extends generally parallel to said rod shaft and is offset laterally to one side of said rod shaft on the same side thereof as that on which said butt grip segment is laterally offset from the central axis of said rod shaft.

30. A fishing rod and handle assembly as defined in claim 1 wherein:

at least at said forward location on said butt grip segment, said butt grip segment curves laterally outwardly in the form of a partial helix where the butt grip segment is laterally offset.

* * * * *